(12) United States Patent
Azernikov et al.

(10) Patent No.: US 12,711,719 B2
(45) Date of Patent: Aug. 18, 2026

(54) INTEGRATED DENTAL RESTORATION DESIGN PROCESS AND SYSTEM

(71) Applicant: James R. Glidewell Dental Ceramics, Inc., Newport Beach, CA (US)

(72) Inventors: Sergei Azernikov, Irvine, CA (US); Michael J. Selberis, Ladera Ranch, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 103 days.

(21) Appl. No.: 18/353,550

(22) Filed: Jul. 17, 2023

(65) Prior Publication Data

US 2024/0029380 A1 Jan. 25, 2024

Related U.S. Application Data

(60) Provisional application No. 63/369,151, filed on Jul. 22, 2022.

(51) Int. Cl.
*G06T 19/20* (2011.01)
*A61C 13/34* (2006.01)

(52) U.S. Cl.
CPC .............. *G06T 19/20* (2013.01); *A61C 13/34* (2013.01); *G06T 2210/41* (2013.01); *G06T 2219/2021* (2013.01)

(58) Field of Classification Search
CPC ................. G06T 19/20; G06T 2210/41; G06T 2219/2021; A61C 13/34; A61C 13/0004; G06N 3/045; G06N 3/047; G06N 3/08
See application file for complete search history.

(56) References Cited

U.S. PATENT DOCUMENTS 7,187,790 B2 3/2007 Sabol et al.
7,228,191 B2 6/2007 Hofmeister et al.
7,555,403 B2 6/2009 Kopelman et al.
8,033,828 B2 10/2011 Coopersmith
8,126,726 B2 2/2012 Matov et al.
8,200,462 B2 6/2012 Marshall et al.
8,386,062 B2 2/2013 Yau et al.
8,628,327 B1 1/2014 Blaisdell et al.
9,208,531 B2 12/2015 Boerjes et al.
(Continued)

FOREIGN PATENT DOCUMENTS

EP 3671531 A1 6/2020
EP 3767521 A1 1/2021
(Continued)

OTHER PUBLICATIONS

US 11,890,158 B2, 02/2024, Roschin et al. (withdrawn)
(Continued)

*Primary Examiner* — Chong Wu
(74) *Attorney, Agent, or Firm* — Klarquist Sparkman, LLP

(57) ABSTRACT

A method and system receives a 3D digital dental model representing at least a portion of a patient's dentition, automatically determines a virtual dental preparation site in the 3D digital dental model using a first neural network, automatically generates a 3D digital dental prosthesis model in the 3D digital dental model using a second trained generative deep neural network and automatically routes the 3D digital dental model comprising the virtual 3D dental prosthesis model to a quality control ("QC") user.

15 Claims, 26 Drawing Sheets

(56) References Cited

U.S. PATENT DOCUMENTS

| | | | |
|---|---|---|---|
| 9,474,582 B2 | 10/2016 | Musuvathy et al. | |
| 9,895,209 B2 | 2/2018 | Blaisdell et al. | |
| 10,016,260 B2 | 7/2018 | Blaisdell et al. | |
| 10,470,853 B2 | 11/2019 | Leeson et al. | |
| 10,568,720 B2 | 2/2020 | Liston et al. | |
| 10,912,626 B2 | 2/2021 | Selberis et al. | |
| 10,932,890 B1 | 3/2021 | Sant et al. | |
| 11,007,040 B2 | 5/2021 | Azernikov et al. | |
| 11,185,394 B2 | 11/2021 | Nikolskiy et al. | |
| 11,291,532 B2 | 4/2022 | Azernikov et al. | |
| 11,351,015 B2 | 6/2022 | Leeson et al. | |
| 11,678,953 B2 | 6/2023 | Kopelman et al. | |
| 11,903,779 B2 | 2/2024 | Fisker et al. | |
| 11,903,780 B2 | 2/2024 | Schneider et al. | |
| 12,136,208 B2 | 11/2024 | Chelnokov et al. | |
| 12,236,594 B2 | 2/2025 | Azernikov et al. | |
| 12,295,806 B2 | 5/2025 | Azernikov et al. | |
| 2007/0141536 A1 | 6/2007 | Provost et al. | |
| 2007/0172787 A1 | 7/2007 | Fornoff | |
| 2010/0309301 A1 | 12/2010 | Thiel et al. | |
| 2015/0056576 A1 | 2/2015 | Nikolskiy et al. | |
| 2015/0272704 A1 | 10/2015 | Watson et al. | |
| 2017/0340418 A1 | 11/2017 | Raanan | |
| 2018/0008213 A1 | 1/2018 | Rubbert | |
| 2018/0028294 A1 | 2/2018 | Azernikov et al. | |
| 2018/0132982 A1 | 5/2018 | Nikolskiy et al. | |
| 2018/0368956 A1 | 12/2018 | Fisker | |
| 2019/0083208 A1 | 3/2019 | Hansen et al. | |
| 2019/0083209 A1 | 3/2019 | Lior et al. | |
| 2019/0282344 A1 | 9/2019 | Azernikov et al. | |
| 2019/0318479 A1* | 10/2019 | Ajri | G06F 17/18 |
| 2020/0000562 A1 | 1/2020 | Wey | |
| 2020/0022790 A1 | 1/2020 | Fisker | |
| 2020/0268495 A1 | 8/2020 | Ryakhovsky et al. | |
| 2020/0273248 A1 | 8/2020 | Jorgensen et al. | |
| 2020/0405464 A1 | 12/2020 | Nikolskiy et al. | |
| 2021/0005017 A1 | 1/2021 | Hallenbeck | |
| 2021/0038350 A1 | 2/2021 | Otawa | |
| 2021/0093421 A1 | 4/2021 | Michaeli et al. | |
| 2021/0100643 A1 | 4/2021 | Weiss et al. | |
| 2021/0251729 A1 | 8/2021 | Schneider et al. | |
| 2021/0321872 A1 | 10/2021 | Saphier et al. | |
| 2021/0353154 A1* | 11/2021 | Saphier | G16H 40/67 |
| 2022/0008175 A1 | 1/2022 | Ojelund et al. | |
| 2022/0350936 A1 | 11/2022 | Azernikov et al. | |
| 2023/0200961 A1 | 6/2023 | Mason et al. | |
| 2025/0143852 A1 | 5/2025 | Yang et al. | |

FOREIGN PATENT DOCUMENTS

| | | |
|---|---|---|
| EP | 3797732 A1 | 3/2021 |
| KR | 102334519 B1 | 12/2021 |
| WO | 2019204520 A1 | 10/2019 |
| WO | 2020161245 A1 | 8/2020 |
| WO | 2020173912 A1 | 9/2020 |
| WO | 2021009258 A1 | 1/2021 |
| WO | 2021046147 A1 | 3/2021 |
| WO | 2021058643 A1 | 4/2021 |
| WO | 2021210723 A1 | 10/2021 |
| WO | 2021210966 A1 | 10/2021 |
| WO | 2021214212 A1 | 10/2021 |

OTHER PUBLICATIONS

PCT/US2023/070692, International Search Report and Written Opinion, mailed Dec. 13, 2023, in 16 pages.

Thibault Groueix et al., A Papier-Mache Approach to Learning 3D Surface Generation, p. 216-224.

Imagoworks web page, https://imagoworks.ai/#technology, copyright 2021 downloaded on Feb. 18, 2022, pp. 1-8.

Charles R. Qi et al., PointNet: Deep Learning on Point Sets for 3D Classification and Segmentation, pp. 652-660.

Charles R. Qi et al., Deep Hierarchical Feature Learning on Point Sets in a Metric Space, Jun. 7, 2017, in 14 pages.

Raydent CAD, AI Based Dental CAD Solution brochure, in 7 pages, downdloaded Feb. 18, 2022.

Youngjun Kevin Kim, Imagoworks B2B Collaboration Proposal, Sep. 2021, in 32 pages.

* cited by examiner

INTEGRATED DENTAL RESTORATION DESIGN PROCESS AND SYSTEM

CROSS-REFERENCE TO RELATED APPLICATIONS

The present application claims priority to and the benefit of U.S. Provisional Patent Application Ser. No. 63/369,151, entitled Integrated Dental Restoration Design Process and System, filed on Jul. 22, 2022, which is hereby incorporated by reference in its entirety.

BACKGROUND

Recently, CAD/CAM dentistry (Computer-Aided Design and Computer-Aided Manufacturing in dentistry) has provided a broad range of dental restorations, including crowns, veneers, inlays and onlays, fixed bridges, dental implant restorations, and orthodontic appliances. In a typical CAD/CAM based dental procedure, a treating dentist can prepare the tooth being restored either as a crown, inlay, onlay or veneer. The prepared tooth and its surroundings are then scanned by a three dimensional (3D) imaging camera and uploaded to a computer for design. Alternatively, a dentist can obtain an impression of the tooth to be restored and the impression may be scanned directly, or formed into a model to be scanned, and uploaded to a computer for design.

Current dental CAD can often be tedious, time-consuming, and can lead to inconsistencies in design. Minimizing the amount of time and minimizing errors involved in CAD of dental restorations is of high interest. The ultimate goal is to provide an automatic and integrated solution capable of delivering quality designs consistently. In order to build such a highly autonomous dental CAD system, high level expertise needs to be integrated into the software.

SUMMARY

Disclosed is a computer-implemented method of providing a 3D digital dental restoration, the method that can include receiving a 3D digital dental model representing at least a portion of a patient's dentition, automatically determining a virtual dental preparation site in the 3D digital dental model using a first neural network, automatically generating a 3D digital dental prosthesis model in the 3D digital dental model using a second trained generative deep neural network, and automatically routing the 3D digital dental model comprising the virtual 3D dental prosthesis model to a quality control ("QC") user.

Also disclosed is a non-transitory computer readable medium storing executable computer program instructions to provide a 3D digital dental restoration, the computer program instructions that can include instructions for: receiving a 3D digital dental model representing at least a portion of a patient's dentition, automatically determining a virtual dental preparation site in the 3D digital dental model using a first neural network, automatically generating a 3D digital dental prosthesis model in the 3D digital dental model using a second trained generative deep neural network, and automatically routing the 3D digital dental model comprising the virtual 3D dental prosthesis model to a quality control ("QC") user.

Also disclosed is a system for providing a digital dental restoration. The system can include a processor and a non-transitory computer-readable storage medium including instructions executable by the processor to perform steps including: receiving a 3D digital dental model representing at least a portion of a patient's dentition, automatically determining a virtual dental preparation site in the 3D digital dental model using a first neural network, automatically generating a 3D digital dental prosthesis model in the 3D digital dental model using a second trained generative deep neural network, and automatically routing the 3D digital dental model comprising the virtual 3D dental prosthesis model to a quality control ("QC") user.

BRIEF DESCRIPTION OF THE DRAWINGS

FIG. 15(*b*) illustrates an example of adjusting mesial contact points in some embodiments.

FIG. 15(*c*) illustrates an example of adjusting distal contact points in some embodiments.

FIG. 15(*d*) illustrates a generated 3D digital dental prosthesis model as viewed from the occlusal direction.

FIGS. 15(*e*) and 15(*f*) illustrate example of a GUI in some embodiments allowing adjustment of the shape or contour of the automatically generated 3D digital dental prosthesis.

FIG. 15(*g*) illustrates an example in which the QC process displays the determined margin line proposal.

DETAILED DESCRIPTION

Figure 1:
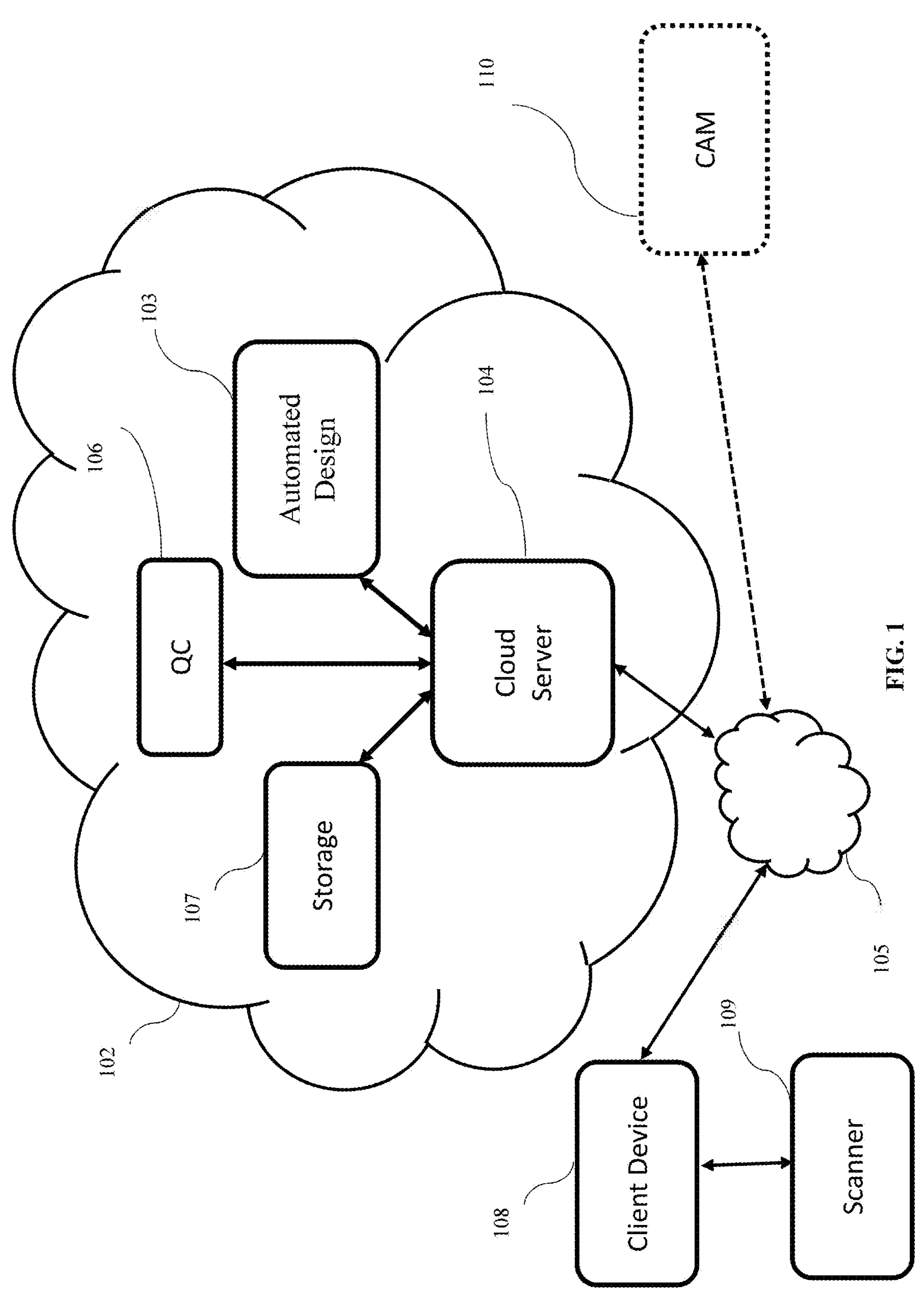
FIG. 1 shows a diagram of an example of a cloud computing environment of an integrated restoration design service process and system in some embodiments.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like “provide” or “achieve” to describe the disclosed methods. The actual operations that correspond to these terms may vary depending on the particular implementation and are readily discernible by one of ordinary skill in the art.

As used in this application and in the claims, the singular forms “a,” “an,” and “the” include the plural forms unless the context clearly dictates otherwise. Additionally, the term “includes” means “comprises.” Further, the terms “coupled” and “associated” generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as “lowest,” “best,” “minimum,” or the like. It will be appreciated that such descriptions are intended to indicate that a selection among many alternatives can be made, and such selections need not be better, smaller, or otherwise preferable to other selections.

In the following description, certain terms may be used such as “up,” “down,” “upper,” “lower,” “horizontal,” “vertical,” “left,” “right,” and the like. These terms are used, where applicable, to provide some clarity of description when dealing with relative relationships. But, these terms are not intended to imply absolute relationships, positions, and/or orientations. For example, with respect to an object, an “upper” surface can become a “lower” surface simply by turning the object over. Nevertheless, it is still the same object.

As used herein, the term “dental prosthesis” can refer to any dental restorative (restoration) including, without limitation, crowns, bridges, dentures, partial dentures, implants, onlays, inlays, or veneers.

Some embodiments in the present disclosure can include providing an integrated workflow that can perform one or more steps in an integrated restoration design service process and system automatically. As part of the integrated workflow, some embodiments in the present disclosure can include a computer-implemented method and/or a system for designing a dental restoration associated with dental model of dentition. The method and/or system can in some embodiments provide a simplified, automated workflow to digitally design the dental restoration automatically. In some embodiments, the integrated workflow along with any corresponding computer-implemented method and/or system can be implemented in a cloud computing environment. As is known in the art, the cloud computing environment can include, without limitation, one or more devices such as, for example one or more computing units such as servers, for example, networks, storage, and/or applications that are enabled over the internet and accessible to one or more permitted client devices. One example of a cloud computing environment can include Amazon Web Services, for example. Other cloud computing environment types can be used, including, but not limited to, private cloud computing environments available to a limited set of clients such as those within a company, for example. In some embodiments, the system can be implemented in a cloud computing environment.

FIG. 1 illustrates one example of a cloud computing environment or system 102 for supporting integrated digital workflow for providing dental restoration design and/or fabrication according to some embodiments. The cloud computing environment 102 can include a dental restoration cloud server 104, automated design feature 103, quality control (“QC”) feature 106, storage 107, and other components commonly known in the art for cloud computing in some embodiments. Each of the components in the cloud computing environment 102 can in some embodiments be interconnected for example by the dental restoration cloud server 104 or directly to one another or through one or more other servers or computers within the cloud computing environment or system 102. One or more client devices 108 can connect to the dental restoration cloud server 104 directly or through one or more networks 105 in some embodiments. The one or more client devices 108 can each connect with one or more scanners 109 known in the art to scan patient’s dentition or a dental impression, for example, and provide a 3D digital dental model of at least a portion of a patient’s dentition. The dental restoration cloud server 104 can connect to one or more fabrication providers 110 directly and/or through one or more networks 105. Only one dental restoration cloud server 104, one automated design feature 103, one client device 108, one scanner 109, one third party fabrication provider 110, and one storage 107 are shown in FIG. 1 in order to simplify and clarify the description. Embodiments of the cloud computing environment 102 can have multiple dental restoration cloud servers 104, automated design features 103, client devices 108, scanners 109, fabrication providers 110, QC features 106, and storage 107. Likewise, the features and arrangements/connections made by the various entities of FIG. 1 may differ in different embodiments.

As part of the integrated work flow, the dental restoration cloud server 104 can in some embodiments receive dental restoration cases from the client devices 108 operated by clients, manage the dental restoration cases between the different clients, and, in turn, provide finished dental restoration designs and/or milled dental restorations to the clients. In some embodiments, the dental restoration cases may include design only cases that only request the dental restoration cloud server 104 to provide a digital design of the dental restoration. In some embodiments, the dental restoration cases may request the dental restoration cloud server 104 not only to provide a design, but also to fabricate the dental restoration. In some embodiments, the dental restoration cases may request fabrication only.

In order to manage dental restoration cases among different clients, the dental restoration cloud server 104 can optionally create accounts and manage profiles for clients. In addition, the dental restoration cloud server 104 can also create accounts for QC users to receive 3D digital dental models and/or 3D digital dental restorations and apply QC changes to generated 3D dental restorations using certain dental restoration QC software 106, manage profiles for the QC users, and route dental restoration cases to and among the QC users 106 as necessary. Furthermore, the dental restoration cloud server 104 can determine workflows of cases.

In some embodiments, the dental restoration cloud server 104 can create, read, update, and delete information related to case management, user management, materials, fabrication, a workflow, queueing, design automation, users, design, and a user interface in storage including without limitation, one or more databases, for example. Other embodiments of the dental restoration cloud server 104 include different and/or additional components. In addition, the features may be distributed among the components in a different manner than described herein. In some embodiments, the cloud computing environment 102 may include a plurality of the dental restoration cloud servers 104 and/or other devices performing work for a plurality of requesting clients.

In the example of FIG. 1, the cloud computing environment 102 can include at least one processor in communication with at least one computer-readable storage medium which can include instructions executable by the at least one processor to perform steps such as receiving a virtual 3D dental model (also referred to as a "3D digital dental model") representing at least a portion of a patient's dentition from a client device 108 that can reside outside of the cloud computing environment 102, for example. The cloud computing environment 102 can include an automated integrated restoration design service process and system 103 to automatically design and generate a virtual 3D dental prosthesis model for the virtual 3D dental model. In some embodiments, the cloud computing environment 102 can implement quality control ("QC") features 106 to evaluate the designed virtual 3D dental prosthesis model and provide feedback to the automated integrated restoration design service process and system 103 to modify the current design and/or future designs. In some embodiments, the QC features can be implemented and/or used outside of the cloud computing environment 102. In some embodiments, the QC feature 106 and automated design 103 can be implemented within the dental restoration cloud server 104. In some embodiments, the QC feature 106 and automated design 103 can be implemented in one or more separate computing environments within the cloud computing environment 102.

The cloud computing environment 102 can output the virtual 3D dental model with the designed virtual 3D dental prosthesis in some embodiments, or can output the designed virtual 3D dental prosthesis only. The cloud computing environment 102 can provide the virtual 3D dental model with the designed virtual 3D dental prosthesis to the client device 108 or other device/system, and/or can optionally to a Computer Aided Manufacturing ("CAM") system/process 110 for fabrication. The CAM system/process 110 can fabricate a physical 3D model of the designed virtual 3D dental prosthesis.

Figure 2:
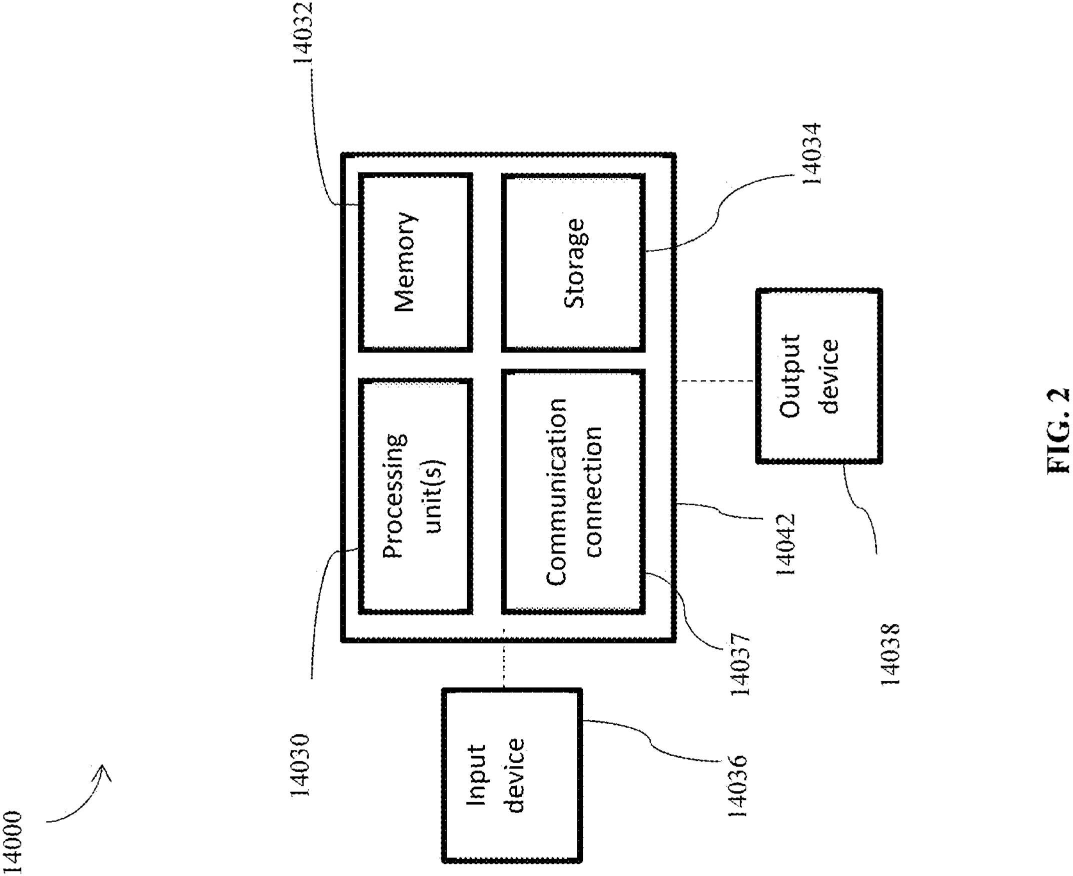
FIG. 2 shows a diagram of an example of a computing environment in some embodiments.

One or more of the features illustrated in FIG. 1 can be implemented with and/or in one or more computing environments. As illustrated in FIG. 2, in some embodiments, a computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers. In some embodiments, the computing environment can be part of a cloud computing environment, and can include and/or access via a network or through direct local connection either by wire or wirelessly, block storage, one or more databases, one or more queues, object storage, identification features, and one or more runtime environments that are also part of the cloud computing environment. One or more features can be implemented in the cloud computing environment, which can be accessible by devices and/or interfaces having access to the cloud computing environment.

Figure 3:
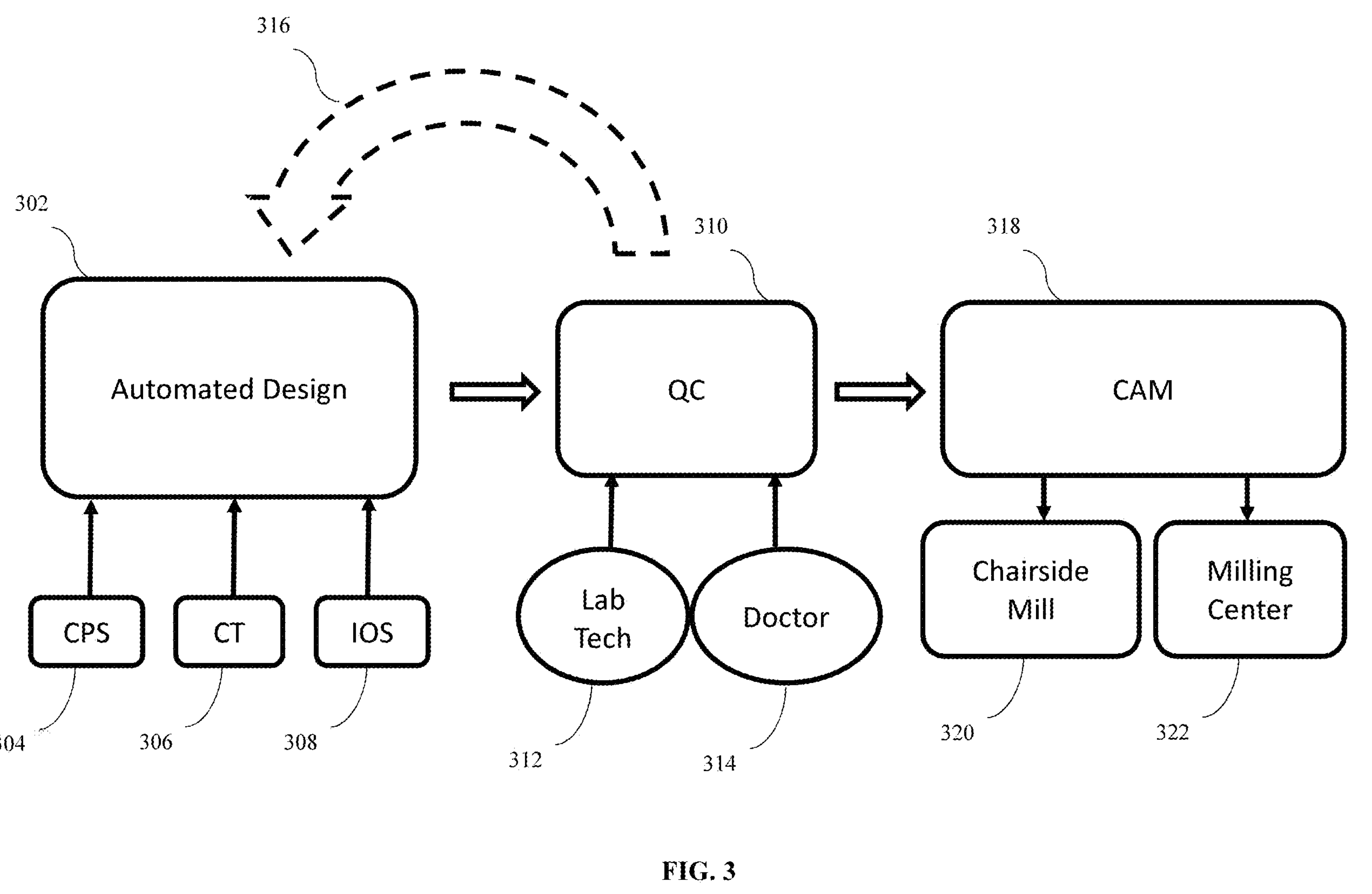
FIG. 3 illustrates a diagram of an example overviewing one or more features of the integrated restoration design service process and system in some embodiments.

FIG. 3 illustrates an overview of one or more features of the integrated design service workflow in some embodiments in more detail. The automated design 302 can receive a virtual 3D dental model generated by any process that scans a patient's dentition or a physical impression of the patient's dentition and generates a virtual 3D dental model of the patient's dentition. In some embodiments, the scanning process can produce STL, PLY, or CTM files, for example that can be suitable for use with a dental design software, such as FastDesign™ dental design software provided by Glidewell Laboratories of Newport Beach, Calif.

For example, the virtual 3D dental model can be generated by a standard intraoral scanning device 308 in some embodiments. The intraoral scanning device can, for example, be handheld in some cases, and can be used by a dentist, technician, or user to scan a patient's dentition. The standard intraoral scanning device and associated hardware and software can then generate the virtual 3D dental model as a standard STL file or other suitable standard format which can be provided to the cloud computing environment or other network implementing the automated integrated restoration design service process and system 302.

In another example, the virtual 3D dental model can be generated by an x-ray computed tomography scanning system ("CT scanner") 306 known in the art that can scan a physical dental impression of a patient's dentition. One example of CT scanning is described in U.S. Patent Application No. US20180132982A1 to Nikolskiy et al., which is hereby incorporated in its entirety by reference. Other types of CT scanners known in the art can be used in some embodiments.

In another example, the virtual 3D dental model can be generated from optically scanning a physical plaster 304 of a patient's dentition created by a dental laboratory, which can generate a virtual 3D dental model based on the scanned plaster model.

In some embodiments, the virtual 3D dental model can be provided to the automated integrated restoration design service process and system 302 through a graphical user interface ("GUI") that can be displayed on a client device by the cloud computing environment. In some embodiments, for example, the GUI can provide an interface that allows a client to log into a dental restoration design server and upload the virtual 3D dental model scanned.

In some embodiments, the cloud computing environment can receive the virtual 3D dental model from a client device and automatically determine a virtual preparation tooth (also referred to as a "digital preparation tooth") in the virtual 3D dental model and automatically generate a virtual 3D dental prosthesis model (also referred to as a "3D digital dental prosthesis") for the virtual preparation tooth. In some embodiments, the cloud computing environment can evaluate the generated 3D dental model and route the generated model optionally with the virtual 3D dental model to perform quality control ("QC") 310 on the generated virtual 3D dental prosthesis model. In some embodiments, QC can optionally be performed by one or more QC users that can include, without limitation, lab technicians 312 and/or dentists/doctors 314, clients in some embodiments, and/or other users. In some embodiments, the final result of the QC modifications can be established as the ground truth. In some embodiments, the QC modifications can be provided to the design feature 302 automatically via a QC feedback loop 316. The QC feedback loop 316 can provide QC modification data to improve future designs, for example. In some embodiments, the current virtual 3D dental prosthesis model that was subject to QC can be regenerated based on the QC feedback loop 316. Once the generated virtual 3D dental prosthesis model passes QC, it can be sent to be physically generated by a CAM process 318 in some embodiments. The CAM process 318 can include, for example, chairside milling 320 or a milling center 322, or any other CAM fabrication process known in the art.

Figure 4:
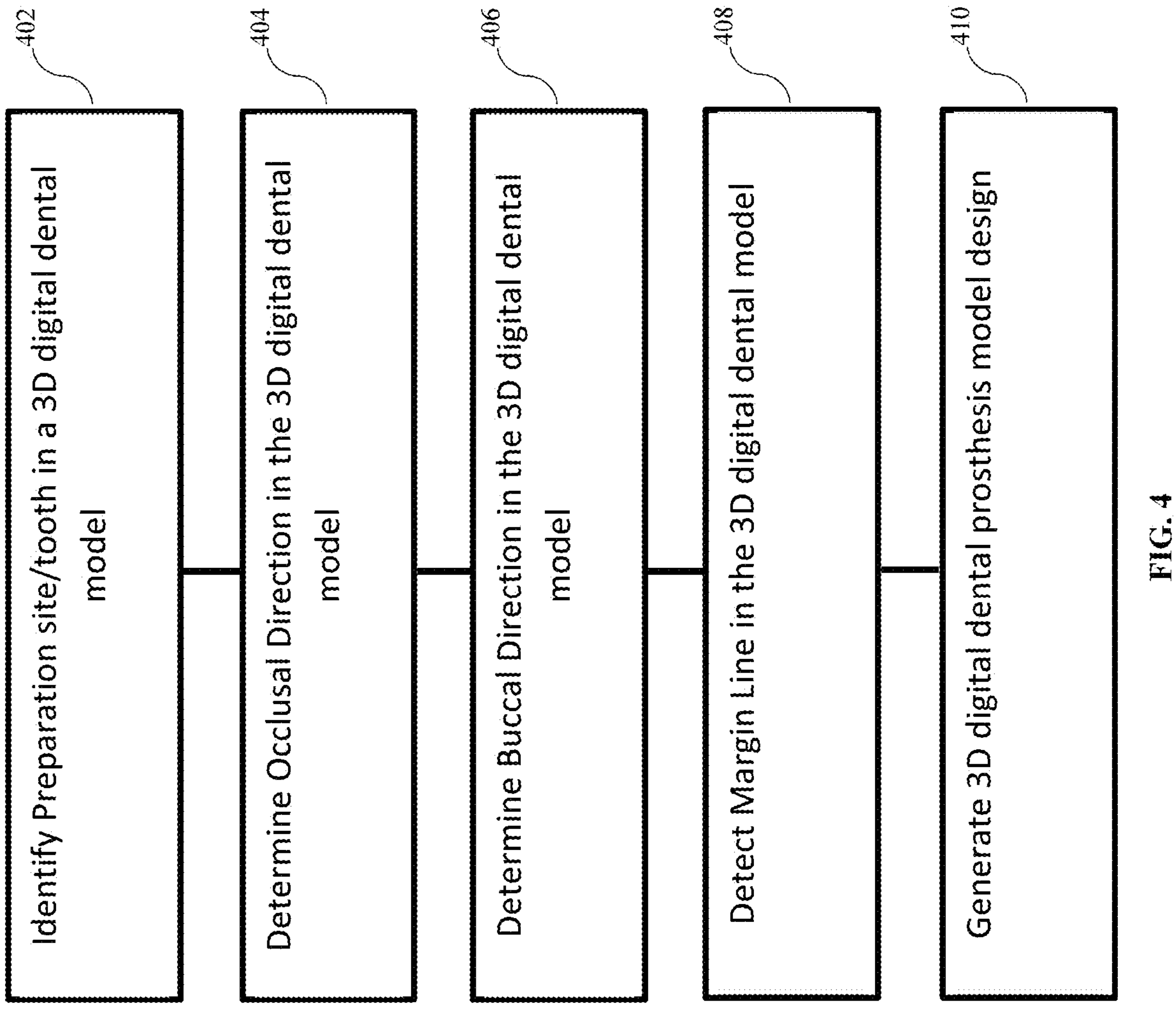
FIG. 4 shows a flow chart of an example of one or more features in some embodiments.

FIG. 4 illustrates a flow diagram showing the automated integrated restoration design service process and system from FIG. 3 in more detail. The automated integrated restoration design service process and system can include one or more of the steps illustrated in FIG. 4. In some embodiments, the steps can be performed sequentially. In some embodiments, the steps can be performed in parallel. In some embodiments, the steps can be performed in any order. The automated integrated restoration design service process and system can receive a 3D digital dental model. The automated integrated restoration design service process and system can automatically identify a preparation site/tooth in a 3D digital dental model 402, automatically determine an occlusal direction in the 3D digital dental model 404, automatically determine a buccal direction in the 3D digital dental model 406, automatically detect a margin line in the 3D digital dental model 408, and/or automatically generate a 3D digital dental prosthesis model design 410, for example in some embodiments, for the 3D digital dental model in some embodiments. In some embodiments, the margin line is of the preparation site/tooth. One or more features can be determined as described in U.S. patent application Ser. No. 17/245,944, the entirety of which is hereby incorporated by reference.

In some embodiments, one or more features can be automatically determined using a trained 3D deep neural network ("DNN") on the volumetric (voxel) representation.

In some embodiments, the DNN can be a convolutional neural network ("CNN"), which is a network that uses convolution in place of the general matrix multiplication in at least one of the hidden layers of the deep neural network. A convolution layer can calculate its output values by applying a kernel function to a subset of values of a previous layer. The computer-implemented method can train the CNN by adjusting weights of the kernel function based on the training data. The same kernel function can be used to calculate each value in a particular convolution layer.

Figure 5:
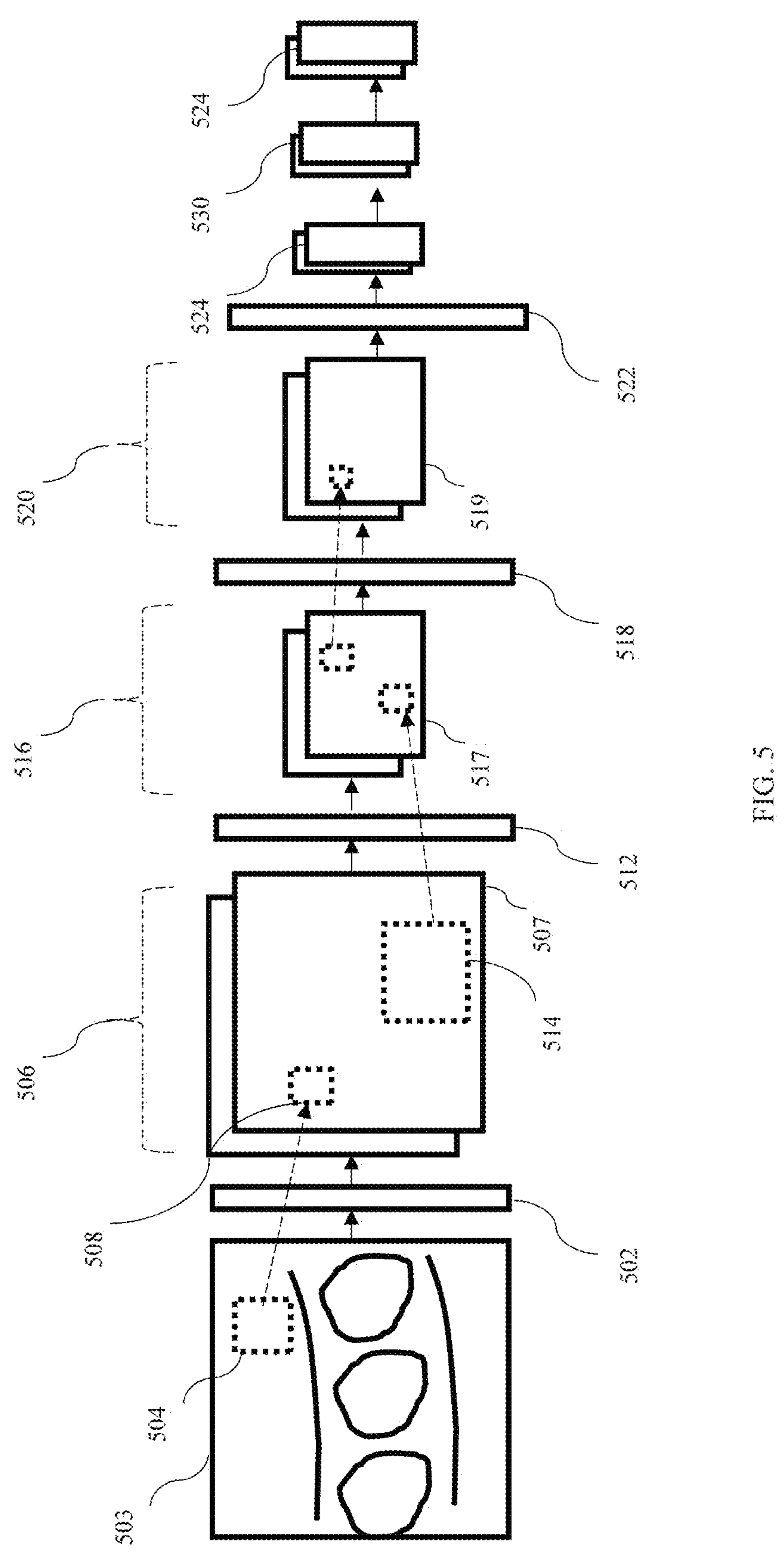
FIG. 5 shows a diagram of a convolutional neural network in some embodiments for example.

FIG. 5 illustrates an example of a CNN in some embodiments. For illustration purposes, a 2D CNN is shown. A 3D CNN can have a similar architecture, but use a three dimensional kernel (x-y-z axis) to provide a three dimensional output after each convolution. The CNN can include one or more convolution layers, such as first convolution layer 502. The first convolution layer 502 can apply a kernel (also referred to as a filter) such as kernel 504 across an input image such as input image 503 and optionally apply an activation function to generate one or more convolution outputs such as first kernel output 508. The first convolution layer 502 can include one or more feature channels. The application of the kernel such as kernel 504 and optionally an activation function can produce a first convoluted output such as convoluted output 506. The kernel can then advance to the next set of pixels in the input image 503 based on a stride length and apply the kernel 504 and optionally an activation function to produce a second kernel output. The kernel can be advanced in this manner until it has been applied to all pixels in the input image 503. In this manner, the CNN can generate a first convoluted image 506, which can include one or more feature channels. The first convoluted image 506 can include one or more feature channels such as 507 in some embodiments. In some cases, the activation function can be, for example, a RELU activation function. Other types of activation functions can also be used.

The CNN can also include one or more pooling layers such as first pooling layer 512. First pooling layer can apply a filter such as pooling filter 514, to the first convoluted image 506. Any type of filter can be used. For example, the filter can be a max filter (outputting the maximum value of the pixels over which the filter is applied) or an average filter (outputting the average value of the pixels over which the filter is applied). The one or more pooling layer(s) can down sample and reduce the size of the input matrix. For example, first pooling layer 512 can reduce/down sample first convoluted image 506 by applying first pooling filter 514 to provide first pooled image 516. The first pooled image 516 can include one or more feature channels 517. The CNN can optionally apply one or more additional convolution layers (and activation functions) and pooling layers. For example, the CNN can apply a second convolution layer 518 and optionally an activation function to output a second convoluted image 520 that can include one or more feature channels 519. A second pooling layer 522 can apply a pooling filter to the second convoluted image 520 to generate a second pooled image 524 that can include one or more feature channels. The CNN can include one or more convolution layers (and activation functions) and one or more corresponding pooling layers. The output of the CNN can be optionally sent to a fully connected layer, which can be part of one or more fully connected layers 530. The one or more fully connected layers can provide an output prediction such as output prediction 524. In some embodiments, the output prediction 524 can include labels of teeth and surrounding tissue, for example. In some embodiments, the output prediction 524 can include identification of one or more features in the 3D digital dental model.

Some embodiments can include determining an occlusal direction of the 3D digital dental model. In some embodiments, the occlusal direction can be determined automatically using a occlusal direction trained neural network. In some embodiments, the occlusal direction trained CNN can be a 3D CNN trained using one or more 3D voxel representations, each representing a patient's dentition, optionally with augmented data such as surface normal for each voxel. 3D CNNs can perform 3D convolutions, which use a 3D kernel instead of a 2D kernel, and operate on 3D input. In some embodiments, the trained 3D CNN receives 3D voxel representations with voxel normals. In some embodiments, a N×N×N×3 float tensor can be used. In some embodiments, N can be 100, for example. Other suitable values of N can be used. In some embodiments, the trained 3D CNN can include 4 levels of 3D convolutions and can include 2 linear layers. In some embodiments, the 3D CNN can operate in the regression regime in which it regresses voxel and their corresponding normals representing of a patient's dention to three numbers, X, Y, Z, coordinates of the unit occlusal vector. In some embodiments, a training set for the 3D CNN can include one or more 3D voxel representations, each representing a patient's dentition. In some embodiments, each 3D voxel representation in the training set can include an occlusal direction marked manually by a user or by other techniques known in the art. In some embodiments, the training set can include tens of thousands of 3D voxel representations, each with a marked occlusion direction. In some embodiments, the training dataset can include 3D point cloud models with marked occlusion direction in each 3D point cloud model. Accordingly, one occlusal direction for each image/model (3D voxel representation) of a patient's dentition is marked in the training dataset by a technician, and the training dataset can include tens of thousands of images/models (3D voxel representations) of corresponding patient dentition. In the training data, coordinates of the unit occlusal vector can be such that X^2+Y^2+Z^2=1 in some embodiments for example.

Some embodiments can include determining a digital preparation site in the virtual 3D digital dental model of patient dentition. In some embodiments, the digital preparation site can be determined automatically using a preparation site trained neural network. In some embodiments, the preparation site trained neural network can determine a 3D center of the digital preparation site (also referred to as the digital preparation die).

In some embodiments, the 3D center of the digital preparation die can be determined automatically. For example, in some embodiments, the 3D center of the digital preparation can be determined using a neural network on an occlusally aligned 3D point cloud. In some embodiments, the trained neural network can provide a 3D coordinate of a center of digital preparation bounding box. In some embodiments, the neural network can be any neural network that can perform segmentation on a 3D point cloud. For example, in some embodiments, the neural network can be a PointNet++ neural network segmentation as described in the present disclosure. In some embodiments, the digital preparation die can be determined by a sphere of a fixed radius around the 3D center of the digital preparation. In some embodiments, the fixed radius can be 0.8 cm for molar and premolars, for example. Other suitable values for the fixed radius can be determined and used in some embodiments, for example. In some embodiments, training the neural network can include using the sampled point cloud (without augmentation) of the digital jaw, centered in the center of mass of the jaw. In some embodiments, the digital jaw point cloud can be oriented in such a way that the occlusal direction is positioned vertically. In some embodiments, the computer-implemented method can train a neural network to determine the digital preparation site/die in a 3D digital dental model by using a training dataset that can include 3D digital models of point clouds of a patient's dentition such as a digital jaw that can include a preparation site, with one or more points within the margin line of the preparation site marked by user using an input device, or any technique known in the art. In some embodiments, the training set can be in the tens of thousands. In some embodiments, the neural network can in operation utilize segmentation to return a bounding box containing the selected points. In some embodiments, the segmentation used can be PointNet++ segmentation, for example.

In some embodiments, the 3D center of the digital preparation die can be determined automatically based on a flat depth map image of the jaw. In the training dataset, the position of a die center can be determined as a geometrical center of margin marked by technicians. In some embodiments, final margin points from completed cases can be used, for example. In some embodiments, the network can receive a depth map image of a jaw from occlusal view and return a position (X, Y) of a die center in the pixel coordinates of the image. For training, a dataset that contains depth map images and corresponding correct answer—float X and Y values—can be used. In some embodiments, the training set can be in the tens of thousands.

In some embodiments, the 3D center of the digital preparation die can optionally be set manually by a user. In some embodiments, the 3D center of the digital preparation die can be set using any technique known in the art.

Some embodiments can include determining a buccal direction of the digital 3D dental model. In some embodiments, the buccal direction can be determined automatically using a buccal trained neural network. In some embodiments, the 3D digital model can include a buccal direction. In some embodiments, the buccal direction can be set manually by a user. In some embodiments, the buccal direction can be determined using any technique known in the art.

In some embodiments, a trained 2D CNN operates on the image representation. In some embodiments, the buccal direction can be determined by providing a 2D depth map image of the 3D digital model mesh to a trained 2D CNN. In some embodiments, the method can optionally include generating a 2D image from the 3D digital model. In some embodiments, the 2D image can be a 2D depth map. The 2D depth map can include a 2D image that contains in each pixel a distance from an orthographic camera to an object along a line passing through the pixel. The object can be, for example, a digital jaw model surface, in some embodiments, for example. In some embodiments, an input can include, for example, an object such as a 3D digital model of patient's dentition ("digital model"), such as a jaw, and a camera orientation. In some embodiments, the camera orientation can be determined based on an occlusion direction. The occlusal direction is a normal to an occlusal plane and the occlusal plane can be determined for the digital model using any technique known in the art. Alternatively, in some embodiments, the occlusal direction can be specified by a user using an input device such as a mouse or touch screen to manipulate the digital model on a display, for example, as described herein. In some embodiments, the occlusal direction can be determined, for example, using the Occlusion Axis techniques described in U.S. patent application Ser. No. 16/451,968 (U.S. Patent Publication No. US20200405464A1), of Nikolskiy et al., the entirety of which is incorporated by reference herein.

Figure 6:
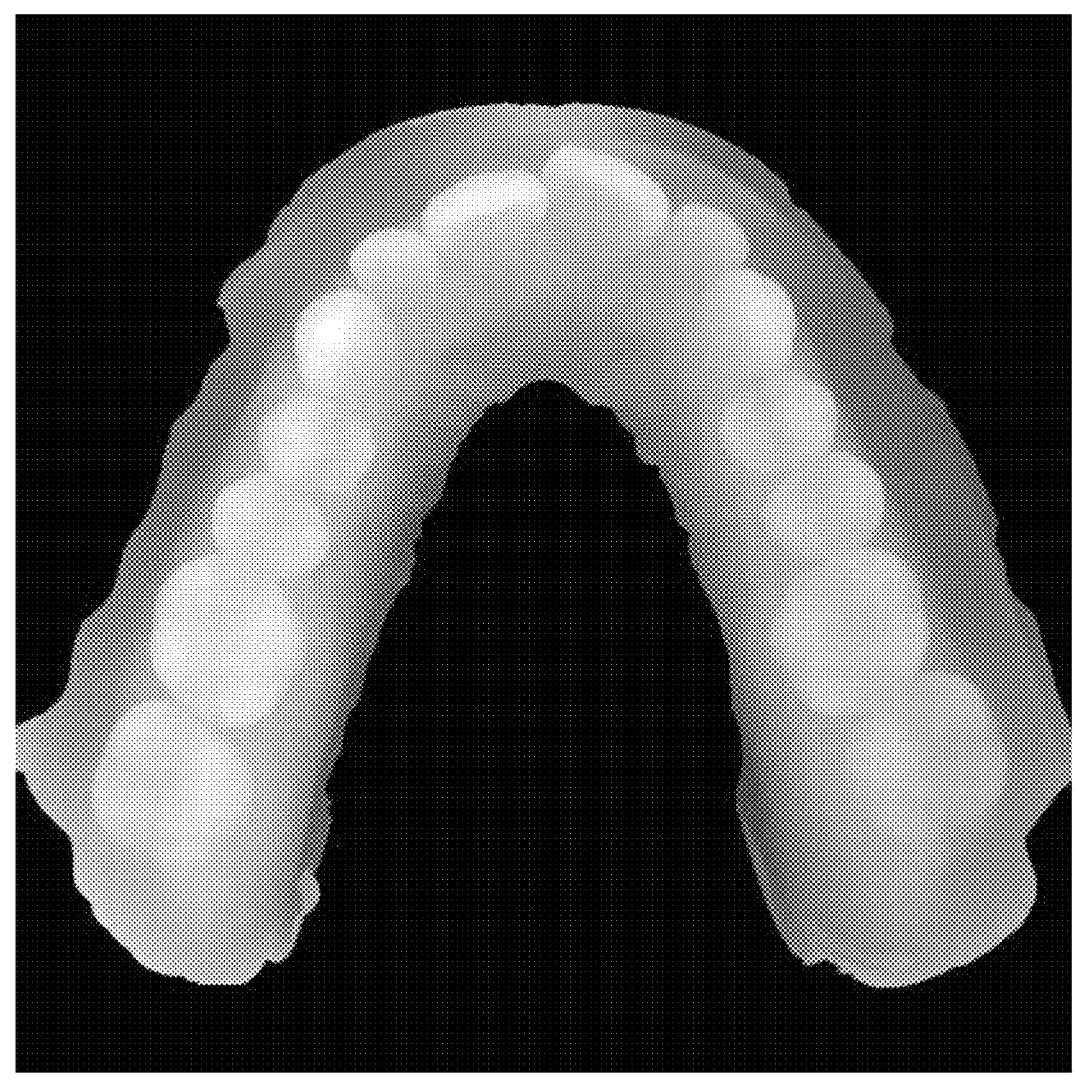
FIG. 6 shows a top perspective view of an example of a 2D depth map of a digital model in some embodiments for example.

The 2D depth map can be generated using any technique known in the art, including, for example z-buffer or ray tracing. For example, in some embodiments, the computer-implemented method can initialize the depth of each pixel (j, k) to a maximum length and a pixel color to a background color, for example. The computer-implemented method can for each pixel in a polygon's projection onto a digital surface such as a 3D digital model determine a depth, z of the polygon at (x, y) corresponding to pixel (j, k). If z<depth of pixel (j, k), then set the depth of the pixel to the depth, z. "Z" can refer to a convention that the central axis of view of a camera is in the direction of the camera's z-axis, and not necessarily to the absolute z axis of a scene. In some embodiments, the computer-implemented method can also set a pixel color to something other than a background color for example. In some embodiments, the polygon can be a digital triangle, for example. In some embodiments, the depth in the map can be per pixel. FIG. 6 illustrates an example of a 2D depth map of a digital model in some embodiments.

In some embodiments, 2D depth map image can include a Von Mises average of 16 rotated versions of the 2D depth map. In some embodiments, the buccal direction can be determined after determining occlusal direction and the 3D center of the digital preparation die. In some embodiments, the 2D depth map image can be of a portion of the digital jaw around the digital preparation die. In some embodiments, regression can be used to determine the buccal direction. In some embodiments, the 2D CNN can include GoogleNet Inception v3, known in the art, for example. In some embodiments, the computer-implemented method can train the buccal trained neural network using a training dataset. In some embodiments, the training dataset can include buccal directions marked in a 3D point cloud model, for example. In some embodiments, the training data set can include tens of thousands to hundreds of thousands of images. In some embodiments, the computer-implemented method pre-process the training dataset by converting each training image to a 2D depth-map as disclosed previously, and training the 2D CNN using the 2D depth-map, for example.

In some embodiments, the computer-implemented method can include determining a margin line proposal. In some embodiments, the computer-implemented method can determine the margin line proposal by receiving the 3D digital model having a digital preparation site and, using an inner representation trained neural network, determine an inner representation of the 3D digital model.

Some embodiments of the computer-implemented method can include determining, using an inner representation trained neural network, an inner representation of the 3D digital model. In some embodiments, the inner representation trained neural network can include an encoder neural network. In some embodiments, the inner representation trained neural network can include a neural network for 3D point cloud analysis. In some embodiments, the inner representation trained neural network can include a trained hierarchal neural network ("HNN"). In some embodiments, the HNN can include a PointNet++ neural network. In some embodiments, the HNN can be any message-passing neural network that operates on geometrical structures. In some embodiments, the geometrical structures can include graphs, meshes, and/or point clouds.

In some embodiments, the computer-implemented method can use an HNN such as PointNet++ for encoding. PointNet++ is described in "PointNet++: Deep Hierarchical Feature Learning on Point Sets in a Metric Space", Charles R. Qi, Li Yi, Hao Su, Leonidas J. Guibas, Stanford University, June 2017, the entirety of which is hereby incorporated by reference. Hierarchal neural networks can, for example, process a sampled set of points in a metric space in a hierarchal way. An HNN such as PointNet++ or other HNN can be implemented by determining a local structure induced by a metric in some embodiments. In some embodiments, the HNN such as PointNet++ or other HNN can be implemented by first partitioning a set of points into two or more overlapping local regions based on the distance metric. The distance metric can be based on the underlying space. In some embodiments, the local features can be extracted. For example, in some embodiments, granular geometric structures from small local neighborhoods can be determined. The small local neighborhood features can be grouped into larger units in some embodiments. In some embodiments, the larger units can be processed to provide higher level features. In some embodiments, the process is repeated until all features of the entire point set are obtained. Unlike volumetric CNNs that scan the space with fixed strides, local receptive fields in HNNs such as PointNet++ or other HNN are dependent on both the input data and the metric. Also, in contrast to CNNs that scan the vector space agnostic of data distribution, the sampling strategy in HNNs such as PointNet++ or other HNN generates receptive fields in a data dependent manner.

In some embodiments, the HNN such as PointNet++ or other HNN can, for example, determine how to partition the point set as well as abstract sets of points or local features with a local feature learner. In some embodiments, the local feature learner can be PointNet, or any other suitable feature learner known in the art, for example. In some embodiments, the local feature learner can process a set of points that are unordered to perform semantic feature extraction, for example. The local feature learner can abstract one or more sets of local points/features into higher level representations. In some embodiments, the HNN can apply the local feature learner recursively. For example, in some embodiments, PointNet++ can apply PointNet recursively on a nested portioning of an input set.

In some embodiments, the HNN can define partitions of a point set that overlap by defining each partition as a neighborhood ball in Euclidean space with parameters that can include, for example, a centroid location and a scale. The centroids can be selected from the input set by farthest point sampling known in the art, for example. One advantage of using an HNN can include, for example, efficiency and effectiveness since local receptive fields can be dependent on input data and the metric. In some embodiments, the HNN can leverage neighborhoods at multiple scales. This can, for example, allow for robustness and detail capture.

In some embodiments, the HNN can include hierarchical point set feature learning. The HNN can build hierarchal grouping of points and abstract larger and larger local regions along the hierarchy in some embodiments, for example. In some embodiments, the HNN can include a number of set abstraction levels. In some embodiments, a set of points is processed at each level and abstracted to produce a new set with fewer elements. In some embodiments, a set abstraction level can, in some embodiments, include three layers: sampling layer, grouping layer, and a local feature learner layer. In some embodiments, the local feature learner layer can be PointNet, for example. A set abstraction level can take an input of a N×(d+C) matrix that is from N points with d-dim coordinates and C-dim point feature and output a N'×(d+C') matrix of N' subsampled points with d-dim coordinates and new C'-dim feature vectors that can summarize local context in some embodiments, for example.

The sampling layer can, in some embodiments, select or sample a set of points from input points. The HNN can define these selected/sampled points as centroids of local regions in some embodiments, for example. For example, for input points $\{x_1, x_2, \ldots, x_n\}$ to the sampling layer, iterative farthest point sampling (FPS) can be used to choose a subset of points $\{x_{i_1}, x_{i_2}, \ldots, x_{i_m}\}$ such that $x_{ij}$ is the most distant point in metric distance from the set $\{x_{i_1}, x_{i_2}, \ldots, x_{i_{j-1}}\}$ with respect to the rest points in some embodiments. This can advantageously provide, for example, better coverage of the whole point set given the same centroid number versus random sampling. This can also advantageously generate, for example, receptive fields in a way that is data dependent versus convolution neural networks (CNNs) which scan vector space independent of data distribution.

The grouping layer can determine one or more local region sets by determining neighboring points around each centroid in some embodiments, for example. In some embodiments, the input to this layer can be a point set of size N×(d+C) and coordinates of a centroids having the size N'×d. In some embodiments, the output of the grouping layer can include, for example groups of point sets having size N'×K×(d+C). Each group can correspond to a local region and K can be the number of points within a neighborhood of centroid points in some embodiments, for example. In some embodiments, K can vary from group to group. However, the next layer—the PointNet layer can convert the flexible number of points into a fixed length local region feature vector, for example. The neighborhood can, in some embodiments, be defined by metric distance, for example. Ball querying can determine all points within a radius to the query point in some embodiments, for example. An upper limit for K can be set. In an alternative embodiment, a K nearest neighbor (kNN) search can be used. kNN can determine a fixed number of neighboring points. However, ball query's local neighborhood can guarantee a fixed region scale, thus making one or more local region features more generalizable across space in some embodiments, for example. This can be preferable in some embodiments for semantic point labeling or other tasks that require local pattern recognition, for example.

In some embodiments, the local feature learner layer can encode local region patterns into feature vectors. For example, given that X=(M, d)) is a discrete metric space whose metric is inherited from a Euclidean space $X^n$, where $M \subseteq R^n$ is the set of points and d is the distance metric, the local feature learner layer can determine functions $f$ that take X as input and output semantically interesting information regarding X. The function $f$ can be a classification function assigning a label to X or a segmentation function which assigns a per point label to each member of M.

Some embodiments can use PointNet as the local feature learner layer, which can, given an unordered point set $\{x_1, x_2, \ldots, x_n\}$ with $x_i \in R^d$, define a set function f: X→R that maps a set of points to a vector such as, for example:

$$f(x_1, x_2, \ldots, x_n) = \gamma\left(\underset{i=1,\ldots,n}{\mathrm{MAX}}\{h(x_i)\}\right).$$

In some embodiments, $\gamma$ and h can be, multi-layer perceptron (MLP) networks for example, or other suitable alternatives known in the art. The function $f$ can be invariant to input point permutations and can approximate any continuous set function in some embodiments, for example. The response of h in some embodiments can be interpreted as a spatial encoding of a point. PointNet is described in "PointNet: Deep Learning on Point Sets for 3D Classification and Segmentation," 2017 IEEE Conference on Computer Vision and Pattern Recognition (CVPR), 2017, pp. 77-85, by R. Q. Charles, H. Su, M. Kaichun and L. J. Guibas, the entirety of which is hereby incorporated by reference.

In some embodiments, the local feature learner layer can receive N' local regions of points. The data size can be, for example, N'×K×(d+C). In some embodiments, each local region is abstracted by its centroid and local features that encodes the centroid's neighborhood, for example, in the output. The output data size can be, for example, N'×(d+C). Coordinates of points in a local region can be translated into a local frame relative to the centroid point in some embodiments:

$$x_i^{(j)} = x_i^{(j)} - \hat{x}^{(j)}$$

for i=1, 2, . . . , K and j=1, 2, . . . , d where $\hat{x}$ is the centroid coordinate in some embodiments, for example. In some embodiments, using relative coordinates with point features can capture point-to-point relations in a local region, for example. In some embodiments, PointNet can be used for local pattern learning.

In some embodiments, the local feature learner can address non-uniform density in the input point set through density adaptive layers, for example. Density adaptive layers can learn to combine features of differently scaled regions when the input sampling density changes. In some embodiments, the density adaptive hierarchical network is a PointNet++ network, for example. Density adaptive layers can include multi-scale grouping ("MSG") or Multi-resolution grouping ("MRG") in some embodiments, for example.

In MSG, multiscale patterns can be captured by applying grouping layers with different scales followed by extracting features of each scale in some embodiments. Extracting features of each scale can be performed by utilizing PointNet in some embodiments, for example. In some embodiments, features at different scales can be concatenated to provide a multi-scale feature, for example. In some embodiments, the HNN can learn optimized multi-scale feature combining by training. For example, random input dropout in which random input points are dropped input points with randomized probability can be used. As an example, a dropout ratio of Θ that is uniformly sampled from [0,p], where p is less than or equal to 1 can be used in some embodiments, for example. As an example, p can be set to 0.95 in some cases so that empty point sets are not generated. Other suitable values can be used in some embodiments, for example.

In MRG, features of one region at a level $L_i$, for example, can be a concatenation of two vectors, with a first vector obtained by summarizing features at each subregion from a lower level $L_{i-1}$ in some embodiments, for example. This can be accomplished using the set abstraction level. A second vector can be the feature obtained by directly processing local region raw points using, for example a single PointNet in some embodiments. In cases where a local region density is low, the second vector can be weighted more in some embodiments since the first vector contains fewer points and includes sampling deficiencies. In cases where a local region density is high, for example, the first vector can be weighted more in some embodiments since the first vector can provide finer details due to inspection at higher resolutions recursively at lower levels.

In some embodiments, point features can be propagated for set segmentation. For example, in some embodiments a hierarchical propagation strategy can be used. In some embodiments, feature propagation can include propagating point features from $N_l$×(d+C) points to $N_{l-1}$ points, where $N_{l-1}$ and $N_l$ ($N_l$ is less than or equal to $N_{l-1}$) are point set size of input and output of set abstraction level l. In some embodiments, feature propagation can be achieved through interpolation of feature values $f$ of $N_l$ points at coordinates of the $N_{l-1}$ points. In some embodiments, an inverse distance weighted average based on k nearest neighbors can be used, for example (p=2, k=3 in equation below; other suitable values can be used). Interpolated features on $N_{l-1}$ can be concatenated with skip linked point features from the set abstraction level in some embodiments, for example. In some embodiments, concatenated features can be passed through a unit PointNet, which can be similar to a one-by-one convolution in convolutional neural networks, for example. Shared fully connected and ReLU layers can be applied to update each point's feature vector in some embodiments, for example. In some embodiments, the process can be repeated until propagated features to the original set of points are determined.

$$f^{(j)}(x) = \frac{\sum_{i=1}^{k} w_i(x) f_i^{(j)}}{\sum_{i=1}^{k} w_i(x)} \text{ where } w_i(x) = \frac{1}{d(x, x_i)^p},\ j = 1, \ldots, C$$

In some embodiments, the computer-implemented method can implement one or more neural networks as disclosed or as are known in the art. Any specific structures and values with respect to one or more neural networks and any other features as disclosed herein are provided as examples only, and any suitable variants or equivalents can be used. In some embodiments, one or more neural network models can be implemented on the base of the Pytorch-geometric package as an example.

Figure 7A:
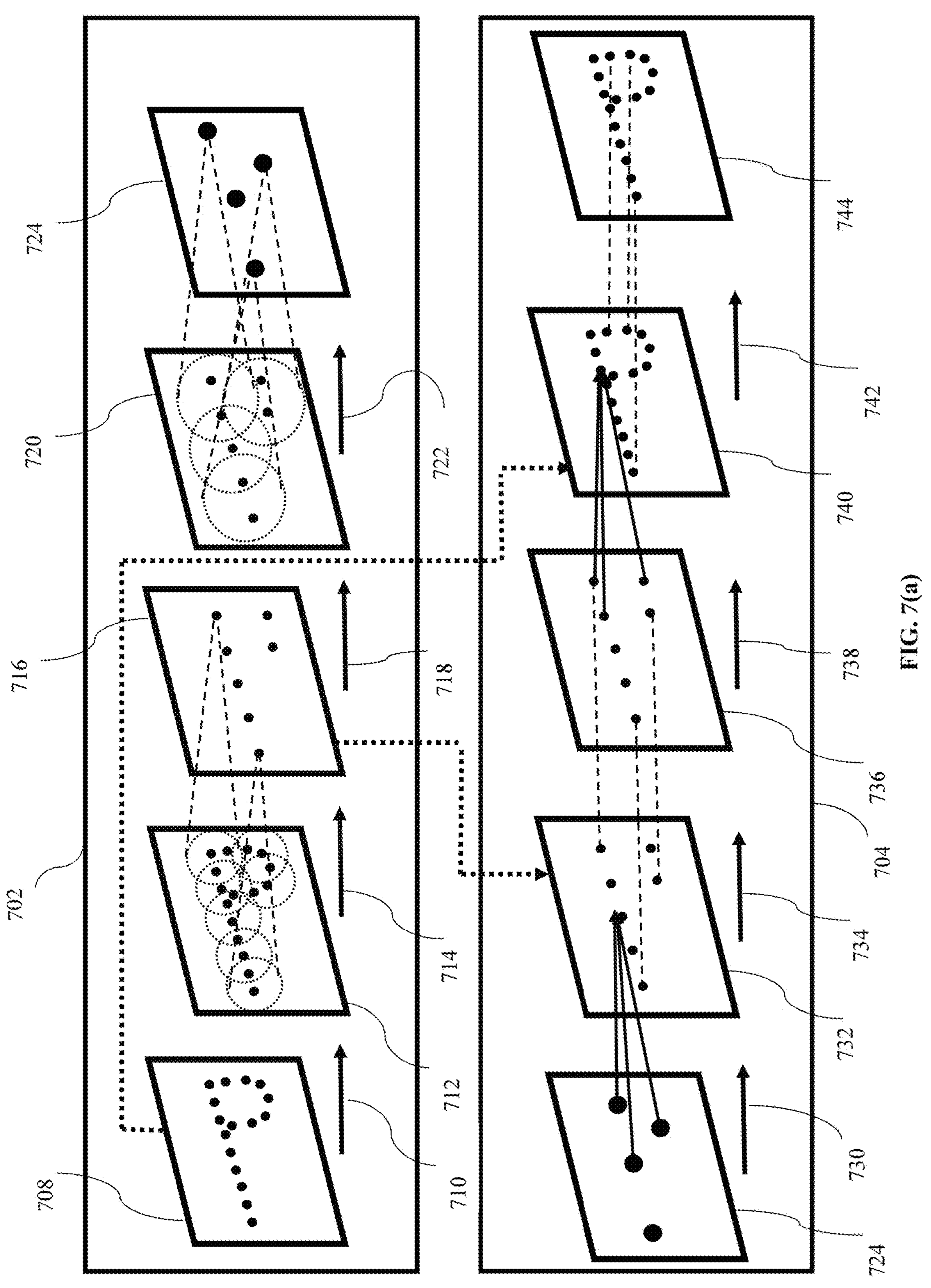
FIGS. 7(*a*) and 7(*b*) show diagrams of a hierarchical neural network in some embodiments for example.
Figure 7B:
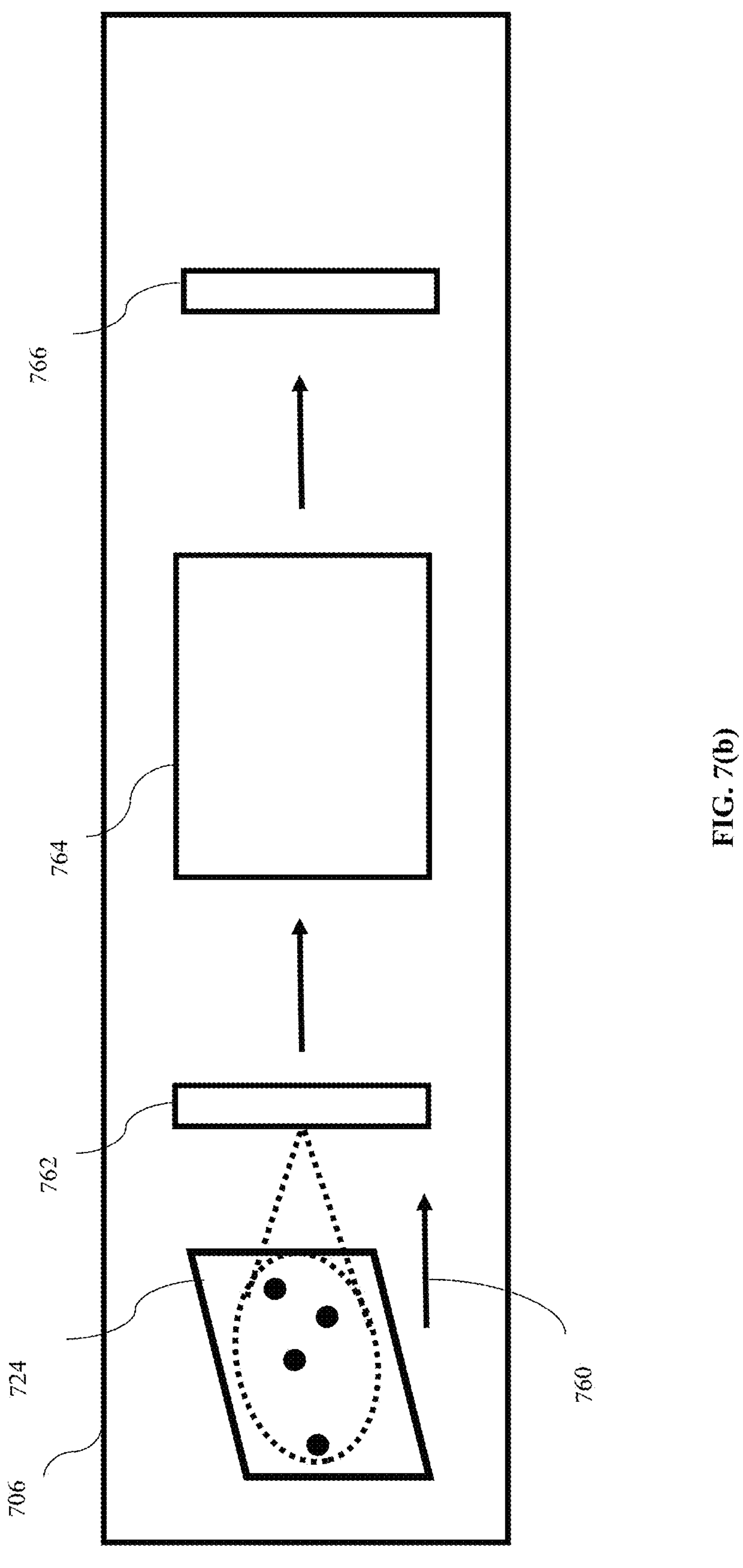

FIG. 7(*a*) and FIG. 7(*b*) illustrate an example of HNN in some embodiments. The HNN can include a hierarchal point set feature learner 702, the output of which can be used to perform segmentation 704 and/or classification 706. The hierarchal point set feature learner 702 example uses points in 2D Euclidean space as an example, but can operate on input 3D images in three dimensions. As illustrated in the example of FIG. 7(*a*), the HNN can receive an input image 708 with (N, d+C) and perform a first sampling and grouping operation 710 to generate a first sampled and grouped image 712 with ($N_1$, K, d+C), for example. The HNN can then provide the first sampled and grouped image 712 to PointNet at 714 to provide first abstracted image 716 with ($N_1$, d+$C_1$). The first abstracted image 716 can undergo sampling and grouping 718 to provide a second sampled and grouped image 720 with ($N_2$, K, d+$C_1$). The second sample and grouped image 720 can be provided to a PointNet neural network 722 to output a second abstracted image 724 with ($N_2$, d+C2).

In some embodiments, the second abstracted image 724 can be segmented by HNN segmentation 704. In some embodiments, the HNN segmentation 704 can take the second abstracted image 724 and perform a first interpolation 730, the output of which can be concatenated with the first abstracted image 716 to provide a first interpolated image 732 with ($N_1$, d+$C_2$+$C_1$). The first interpolated image 732 can be provided to a unit PointNet at 734 to provide first segment image 736 with ($N_1$, d+$C_3$). The first segment image 736 can be interpolated at 738, the output of which can be concatenated with the input image 708 to provide a second interpolated image 740 with ($N_1$, d+$C_3$+C). The second interpolated image 740 can be provided to a unit PointNet 742 to provide a segmented image 744 with (N, k). The segmented image 744 can provide per-point scores, for example.

As illustrated in the example of FIG. 7(*b*), the second abstracted image 724 can be classified by HNN classification 706 in some embodiments. In some embodiments, HNN classification can take second abstracted image 724 and provide it to a PointNet network 760, the output 762 of which can be provided to one or more fully connected layers such as connected layers 764, the output of which can provide class scores 766.

Some embodiments of the computer-implemented method can include determining, using a displacement value trained neural network, a margin line proposal from a base margin line and the inner representation of the 3D digital model.

In some embodiments, the base margin line can be precomputed once per network type. In some embodiments, the network types can include molar and premolar. Other suitable network types can be used in some embodiments for example. In some embodiments, the network types can include other types. In some embodiments, the same base margin line can be used as an initial margin line for each scan. In some embodiments, the base margin line is 3 dimensional. In some embodiments, the base margin line can be determined based on margin lines from a training dataset used to train the inner representation trained neural network and the displacement value trained neural networks. In some embodiments, the base margin line can be a precomputed mean or average of the training dataset margin lines. In some embodiments any type of mean or average can be used.

In some embodiments, the margin line proposal can be a free-form margin line proposal. In some embodiments, a displacement value trained neural network can include a decoder neural network. In some embodiments, the decoder neural network can concatenate the inner representation with specific point coordinates to implement guided decoding. In some embodiments, the guided decoding can generate a closed surface as described in "A Papier-Mache Approach to Learning 3D Surface Generation," by T. Groueix, M. Fisher, V. G. Kim, B. C. Russell and M. Aubry, 2018 IEEE/CVF Conference on Computer Vision and Pattern Recognition, 2018, pp. 216-224, the entirety of which is hereby incorporated by reference.

Figure 8:
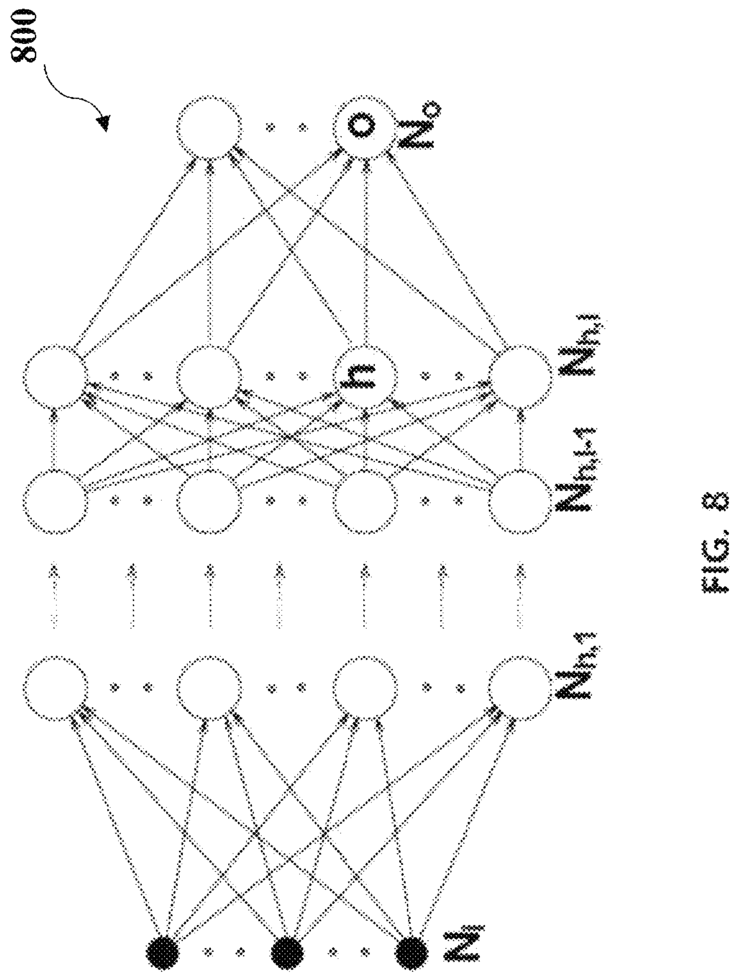
FIG. 8 shows a diagram of deep neural network in some embodiments for example.

In some embodiments, the decoder neural network can include a deep neural network ("DNN"). Referring now to FIG. 8, which is a high-level block diagram showing structure of a deep neural network (DNN) 800 according to some embodiments of the disclosure. DNN 800 includes multiple layers $N_i$, $N_{h,l}$, $N_{h,l-1}$, $N_{h,1}$, $N_o$, etc. The first layer $N_i$ is an input layer where one or more dentition scan data sets can be ingested. The last layer $N_o$ is an output layer. The deep neural networks used in the present disclosure may output probabilities and/or full 3D margin line proposal. For example, the output can be a probability vector that includes one or more probability values of each feature or aspect of the dental models belonging to certain categories. Additionally, the output can be a margin line proposal.

Each layer N can include a plurality of nodes that connect to each node in the next layer N+1. For example, each computational node in the layer $N_{h,\ l-1}$ connects to each computational node in the layer $N_{h,l}$. The layers $N_{h,l}$, $N_{h,l-1}$, $N_{h,1}$, between the input layer $N_i$ and the output layer $N_o$ are hidden layers. The nodes in the hidden layers, denoted as "h" in FIG. 8, can be hidden variables. In some embodiments, DNN 800 can include multiple hidden layers, e.g., 24, 30, 50, etc.

In some embodiments, DNN 800 may be a deep feedforward network. DNN 800 can also be a convolutional neural network, which is a network that uses convolution in place of the general matrix multiplication in at least one of the hidden layers of the deep neural network. DNN 800 may also be a generative neural network or a generative adversarial network. In some embodiments, training may use training data set with labels to supervise the learning process of the deep neural network. The labels are used to map a feature to a probability value of a probability vector. Alternatively, training may use unstructured and unlabeled training data sets to train, in an unsupervised manner, generative deep neural networks that do not necessarily require labeled training data sets.

In some embodiments, the DNN can be a multi-layer perceptron ("MLP"). In some embodiments, the MLP can include 4 layers. In some embodiments, the MLP can include a fully connected MLP. In some embodiments, the MLP utilizes BatchNorm normalization.

Figure 9:
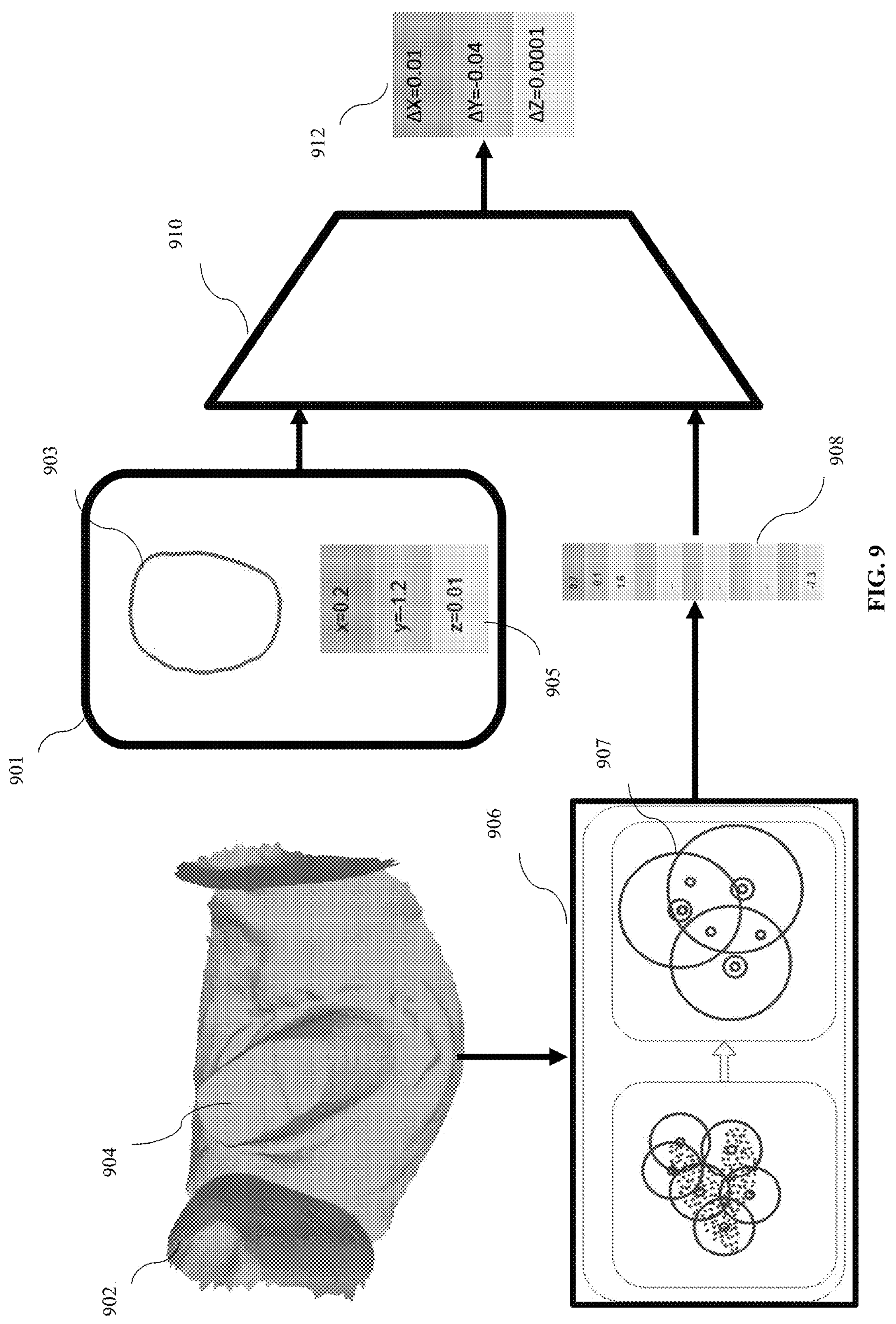
FIG. 9 shows a diagram of a computer-implemented method of automatic margin line proposal in some embodiments for example.

FIG. 9 shows a diagram of a computer-implemented method of automatic margin line proposal in some embodiments as an example. In some embodiments, prior to commencing margin line proposal for any 3D digital model, the computer-implemented method can precompute 901 a base margin line 903 in three dimensions, with each point of the base margin line 903 having 3D coordinates such as coordinates 905, for example. The computer-implemented method can receive a 3D digital model 902 of at least a portion of a jaw. The 3D digital model can, in some embodiments, be in the form of a 3D point cloud. The 3D digital model can include a preparation tooth 904, for example. The computer-implemented method can use an inner representation trained neural network 906 to determine an inner representation 908 of the 3D digital model. In some embodiments, the inner representation trained neural network 906 can be a neural network that performs grouping and sampling 907 and other operations on a 3D digital model, such as an HNN, in some embodiments, for example. In some embodiments, the computer-implemented method can, using a displacement value trained neural network 910, determine a margin line proposal from the base margin line 903 and the inner representation 908 of the 3D digital model. In some embodiments, the displacement value trained neural network can provide, for example, one or more three dimensional displacement values 912 for digital surface points of the base margin line 903.

Figure 10:
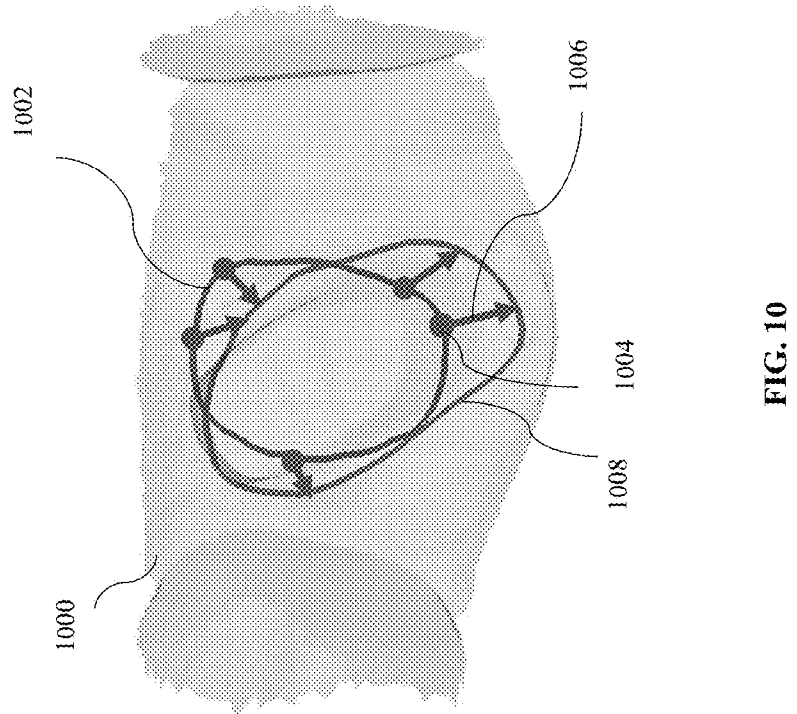
FIG. 10 shows a perspective view of an example of a 3D digital model showing a proposed margin line from a base margin line in some embodiments, for example.

In some embodiments, the displacement value trained neural network can determine a margin line displacement value in three dimensions from the base margin line. In some embodiments, the displacement value trained neural network uses a BilateralChamferDistance as a loss function. In some embodiments, the computer-implemented method can move one or points of the base margin line by a displacement value to provide the margin line proposal. FIG. 10 shows an illustration of an example in some embodiments of adjusting the base margin line 1002 of a 3D digital model 1000. In the example, one or more base margin line points such as base margin line point 1004 can be displaced by a displacement value and direction 1006. Other base margin line points can be similarly adjusted by their corresponding displacement values and directions to form the margin line proposal 1008, for example.

Figure 11A:
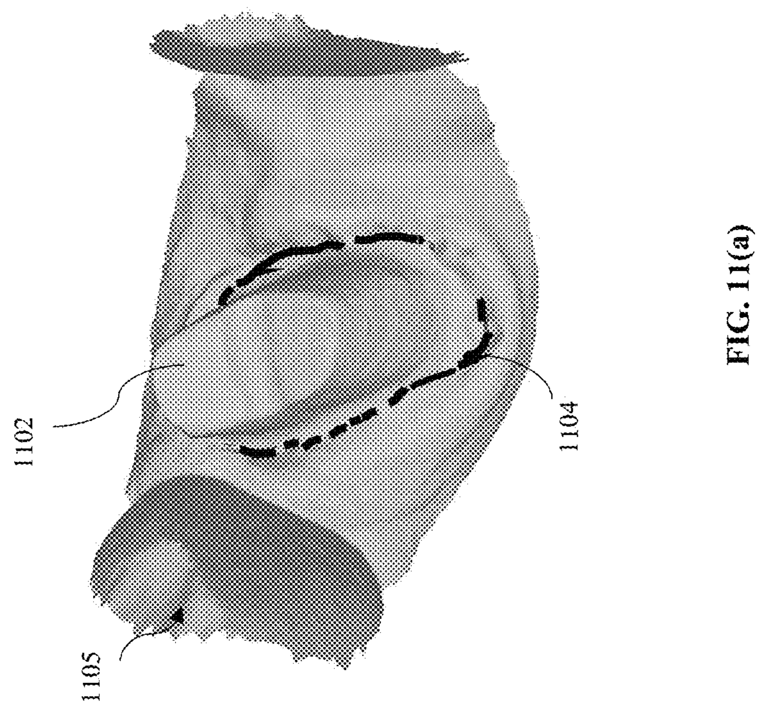
FIGS. 11(*a*) and 11(*b*) show a perspective view of a 3D digital model with a preparation tooth and a proposed margin line in some embodiments for example.
Figure 11B:
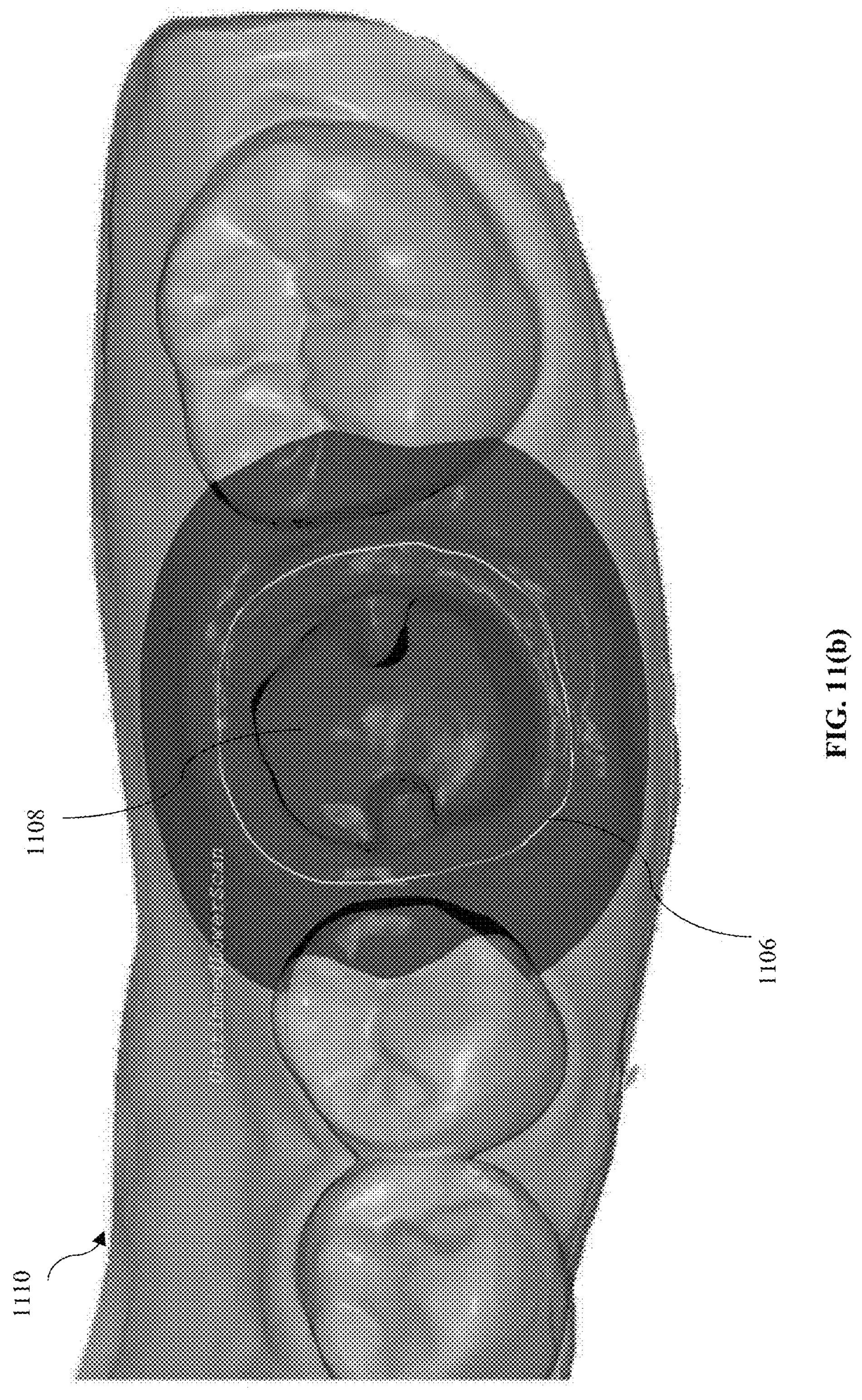

FIG. 11(*a*) illustrates one example of a proposed digital margin line 1104 for a digital preparation tooth 1102 of 3D digital model 1105. As can be seen in the figure, the margin line proposal can be made even in cases where the margin line is partially or completely covered by gum, blood, saliva, or other elements. FIG. 11(*b*) illustrates another example of a proposed digital margin line 1106 for digital preparation tooth 1108 of 3D digital dental model 1110. In some embodiments, the proposed margin line is displayed on the 3D digital model and can be manipulated by a user such as a dental technician or doctor using an input device to make adjustments to the margin line proposal.

In some embodiments, the inner representation trained neural network and the displacement value trained neural network can be trained using the same training dataset. In some embodiments, the training dataset can include one or more training samples. In some embodiments, the training dataset can include 70,000 training samples. In some embodiments, the one or more training samples each can include an occlusal direction, preparation die center, and buccal direction as a normalized positioning and orientation for each sample. In some embodiments, the occlusal direction, preparation die center, and buccal direction can be set manually. In some embodiments, the training dataset can include an untrimmed digital surface of the jaw and a target margin line on a surface of the corresponding trimmed digital surface. In some embodiments, the target margin line can be prepared by a technician. In some embodiments, training can use regression. In some embodiments, training can include using a loss-function to compare the margin line proposal with the target margin line. In some embodiments, the loss function can be a Chamfer-loss function. In some embodiments, the Chamfer-loss function can include:

$$d_{CD}(S_1, S_2) = \sum_{x \in S_1} \min_{y \in S_2} \|x - y\|_2^2 + \sum_{x \in S_2} \min_{y \in S_1} \|x - y\|_2^2$$

In some embodiments, training can be performed on a computing system can include at least one graphics processing unit ("GPU"). In some embodiments, the GPU can include two 2080-Ti Nvidia GPUs, for example. Other suitable GPU types, numbers, and equivalents can be used.

In some embodiments, the computer-implemented method can be performed automatically. Some embodiments can further include displaying the free-form margin line on the 3D digital model. In some embodiments, the free-form margin line can be adjusted by a user using an input device.

Some embodiments can include generating, using a trained deep neural network, a virtual 3D dental prosthesis model based on the virtual 3D dental model. Some embodiments can include automatically generating a 3D digital dental prosthesis model (the virtual 3D dental prosthesis model) in the 3D digital dental model using a trained generative deep neural network. One example of generating a dental prosthesis using a deep neural network is described in U.S. patent application Ser. No. 15/925,078, now U.S. Pat. No. 11,007,040, the entirety of which is hereby incorporated by reference. Another example of generating a dental prosthesis using a deep neural network is described in U.S. patent application Ser. No. 15/660,073, the entirety of which is hereby incorporated by reference.

Example embodiments of methods and computer-implemented systems for generating a 3D model of a dental prosthesis using deep neural networks are described herein. Certain embodiments of the methods can include: training, by one or more computing devices, a deep neural network to generate a first 3D dental prosthesis model using a training data set; receiving, by the one or more computing devices, a patient scan data representing at least a portion of a patient's dentition; and generating, using the trained deep neural network, the first 3D dental prosthesis model based on the received patient scan data.

The training data set can include a dentition scan data set with preparation site data and a dental prosthesis data set. A preparation site on the gum line can be defined by a preparation margin or margin line on the gum. The dental prosthesis data set can include scanned prosthesis data associated with each preparation site in the dentition scan data set.

The scanned prosthesis can be scans of real patients' crowns created based on a library tooth template, which can have 32 or more tooth templates. The dentition scan data set with preparation site data can include scanned data of real preparation sites from patients' scanned dentition.

In some embodiments, the training data set can include a natural dentition scan data set with digitally fabricated preparation site data and a natural dental prosthesis data set, which can include segmented tooth data associated with each digitally fabricated preparation site in the dentition scan data set. The natural dentition scan data set can have two main components. The first component is a data set that includes scanned dentition data of patients' natural teeth. Data in the first component includes all of the patients' teeth in its natural and unmodified digital state. The second component of the natural dentition scan data is a missing-tooth data set with one or more teeth removed from the scanned data. In place of the missing-tooth, a deep neural network fabricated preparation site can be placed at the site of the removed tooth. This process generates two sets of dentition data: a full and unmodified dentition scan data of patients' natural teeth; and a missing-tooth data set (natural dental prosthesis data set) in which one or more teeth are digitally removed from the dentition scan data.

In some embodiments, the method further includes generating a full arch digital model and segmenting each tooth in the full arch to generate natural crown data for use as training data. The method can also include: training another deep neural network to generate a second 3D dental prosthesis model using a natural dentition scan data set with digitally fabricated preparation site data and a natural dental prosthesis data set; generating, using the other deep neural network, the second 3D dental prosthesis model based on the received patient scan data; and blending together features of the first and second 3D dental prosthesis models to generated a blended 3D dental prosthesis model.

Figure 12:
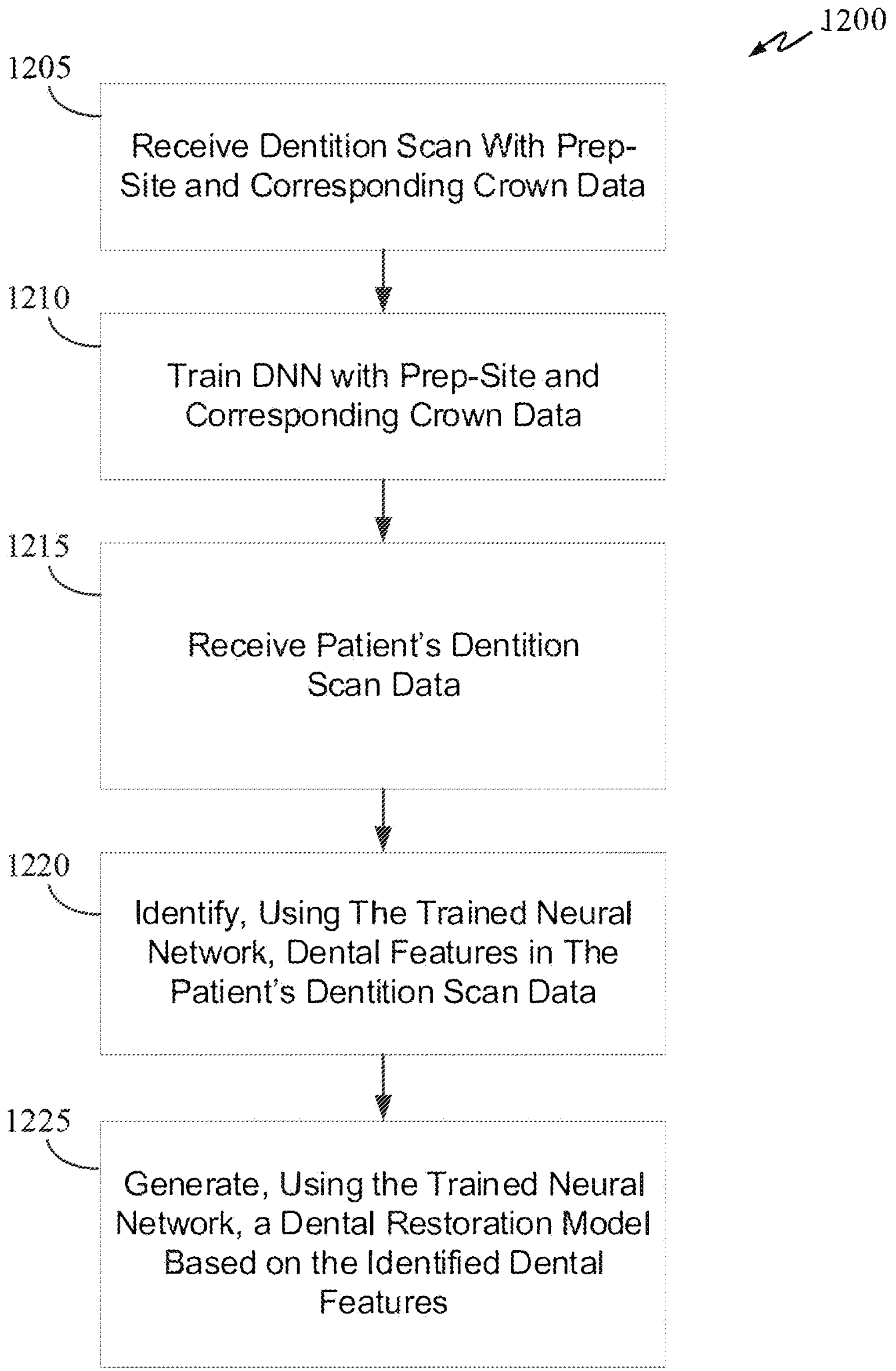
FIG. 12 is a flow chart of a process for generating a 3D dental prosthesis model using a deep neural network in accordance with some embodiments of the present disclosure.

FIG. 12 illustrates a dental prosthesis generation process 1200 using a deep neural network (DNN). Process 1200 starts at 1205 where a dentition scan data set is received or ingested into a database. The dentition scan data set can include one or more scan data sets of real patient's dentitions with dental preparation sites and technician-generated (non-DNN generated) dental prostheses created for those preparation sites. A dental preparation site (also referred to as a tooth preparation or a prepared tooth) is a tooth, a plurality of teeth, or an area on a tooth that has been prepared to receive a dental prosthesis (e.g., crown, bridge, inlay, etc.).

A technician or a non-DNN generated dental prosthesis is a dental prosthesis mainly designed by a technician. Additionally, a technician-generated dental prosthesis can be designed based on a dental template library having a plurality of dental restoration templates. Each tooth in an adult mouth can have one or more dental restoration templates in the dental template library.

In some embodiments, the received dentition scan data set with dental preparation sites can include scan data of real patients' dentition having one or more dental preparation sites. A preparation site can be defined by a preparation margin. The received dentition scan data set can also include scan data of dental prostheses once they are installed on their corresponding dental preparation sites. This data set can be referred to as a dental prosthesis data set. In some embodiments, the dental prosthesis data set can include scan data of technician-generated prostheses before they are installed.

In some embodiments, each dentition scan data set received may optionally be preprocessed before using the data set as input of the deep neural network. Dentition scan data are typically 3D digital image or file representing one or more portions of a patient's dentition. The 3D digital image (3D scan data) of a patient's dentition can be acquired by intraorally scanning the patient's mouth. Alternatively, a scan of an impression or of a physical model of the patient's teeth can be made to generate the 3D scan data of a patient's dentition. In some embodiments, the 3D scan data can be transformed into a 2D data format using, for example, 2D depth maps and/or snapshots.

At 1210, a deep neural network can be trained (by the computer-implemented method or another process for example) using a dentition scan data set having scan data of real dental preparation sites and their corresponding technician-generated dental prostheses—post installation and/or before installation. The above combination of data sets of real dental preparation sites and their corresponding technician-generated dental prostheses can be referred to herein as a technician-generated dentition scan data set. In some embodiments, the deep neural network can be trained using only technician-generated dentition scan data set. In other words, the training data only contain technician-generated dental prostheses, which were created based on one or more dental restoration library templates.

A dental template of the dental restoration library can be considered to be an optimum restoration model as it was designed with specific features for a specific tooth (e.g., tooth #3). In general, there are 32 teeth in a typical adult's mouth. Accordingly, the dental restoration library can have at least 32 templates. In some embodiments, each tooth template can have one or more specific features (e.g., sidewall size and shape, buccal and lingual cusp, occlusal surface, and buccal and lingual arc, etc.) that may be specific to one of the 32 teeth. For example, each tooth in the restoration library is designed to include features, landmarks, and directions that would best fit with neighboring teeth, surrounding gingiva, and the tooth location and position within the dental arch form. In this way, the deep neural network can be trained to recognize certain features (e.g., sidewall size and shape, cusps, grooves, pits, etc.) and their relationships (e.g., distance between cusps) that may be prominent for a certain tooth.

In some embodiments, the computer-implemented method or any other process may train the deep neural network to recognize one or more dentition categories are present or identified in the training data set based on the output probability vector. For example, assume that the training data set contains a large number of depth maps representing patients' upper jaws and/or depth maps representing patients' lower jaws. The computer-implemented method or another process can use the training data set to train the deep neural network to recognize each individual tooth in the dental arch form. Similarly, the deep neural network can be trained to map the depth maps of lower jaws to a probability vector including probabilities of the depth maps belonging to upper jaw and lower jaw, where the probability of the depth maps belonging to lower jaw is the highest in the vector, or substantially higher than the probability of the depth maps belonging to upper jaw.

In some embodiments, the computer-implemented method or another process can train a deep neural network, using dentition scan data set having one or more scan data sets of real dental preparation sites and corresponding technician-generated dental prostheses, to generate full 3D dental restoration model. In this way, the DNN generated 3D dental restoration model inherently incorporates one or more features of one or more tooth templates of the dental restoration library, which may be part of database 150.

Figure 13:
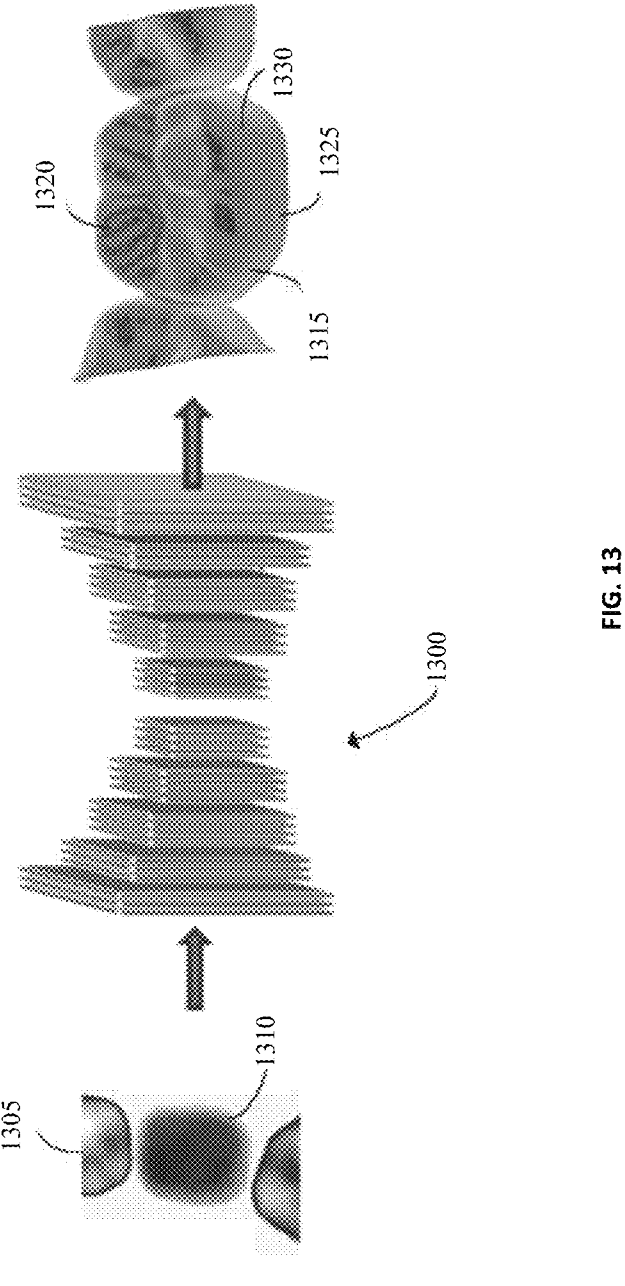
FIG. 13 is a graphic representation of input and output to a deep neural network in accordance with some embodiments of the present disclosure.
Figure 14A:
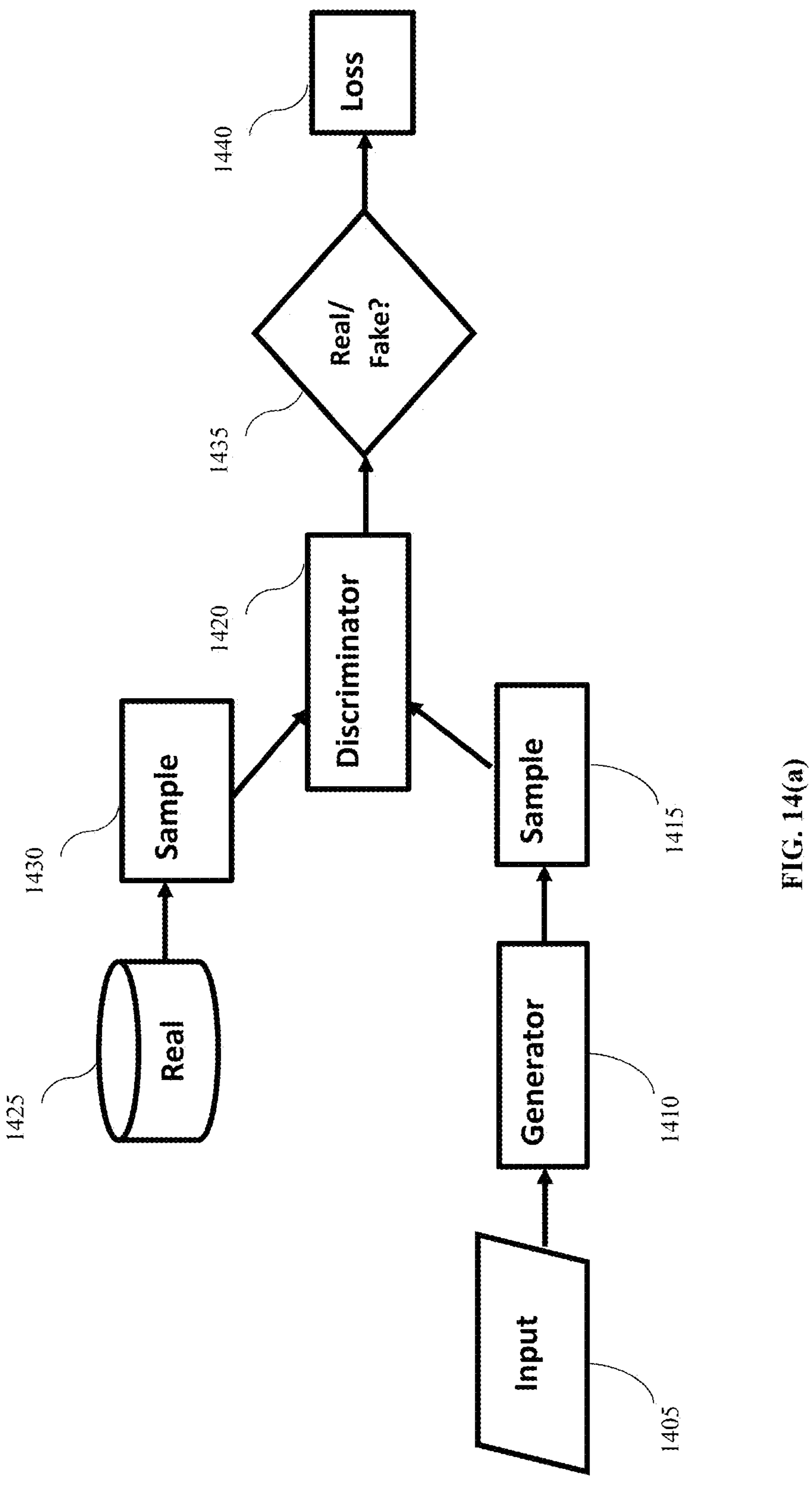
FIG. 14(*a*) and FIG. 14(*b*) are flow diagrams of methods for training a deep neural network to generate a 3D dental prosthesis in accordance with some embodiments of the present disclosure.
Figure 14B:
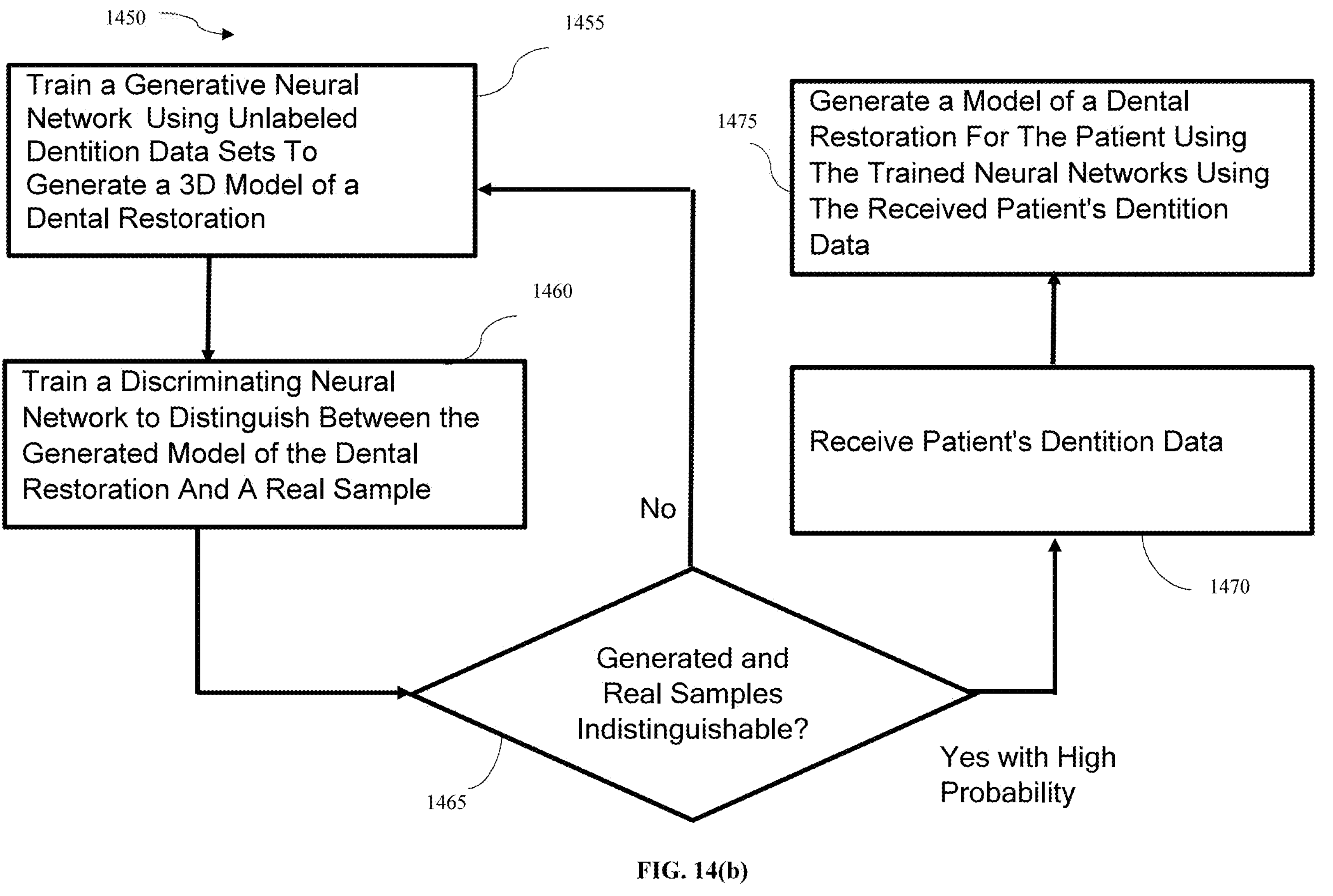
Figure 15A:
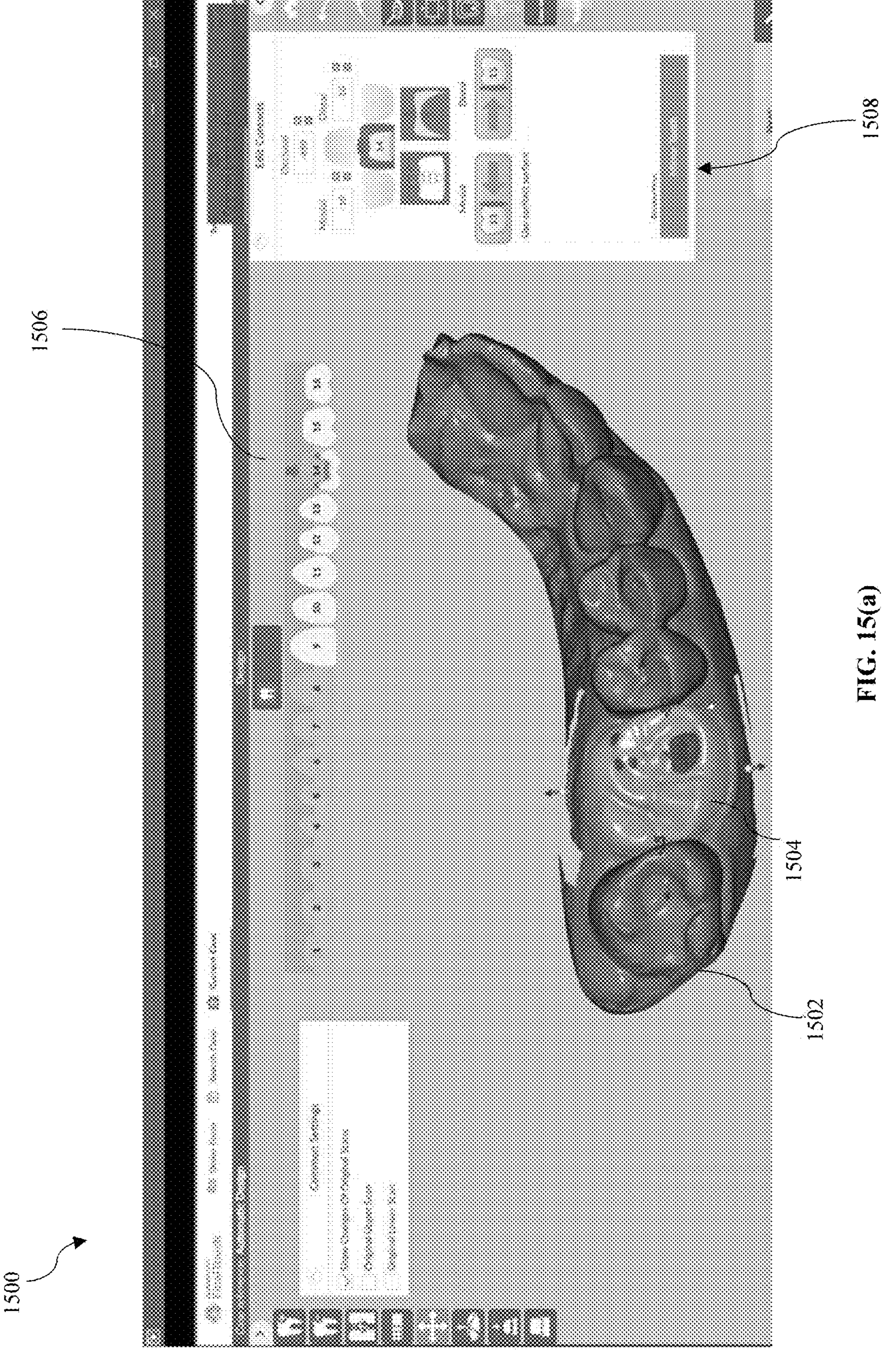
FIG. 15(*a*) illustrates an example of a GUI that can be used as part of the QC process in some embodiments.
Figure 15B:
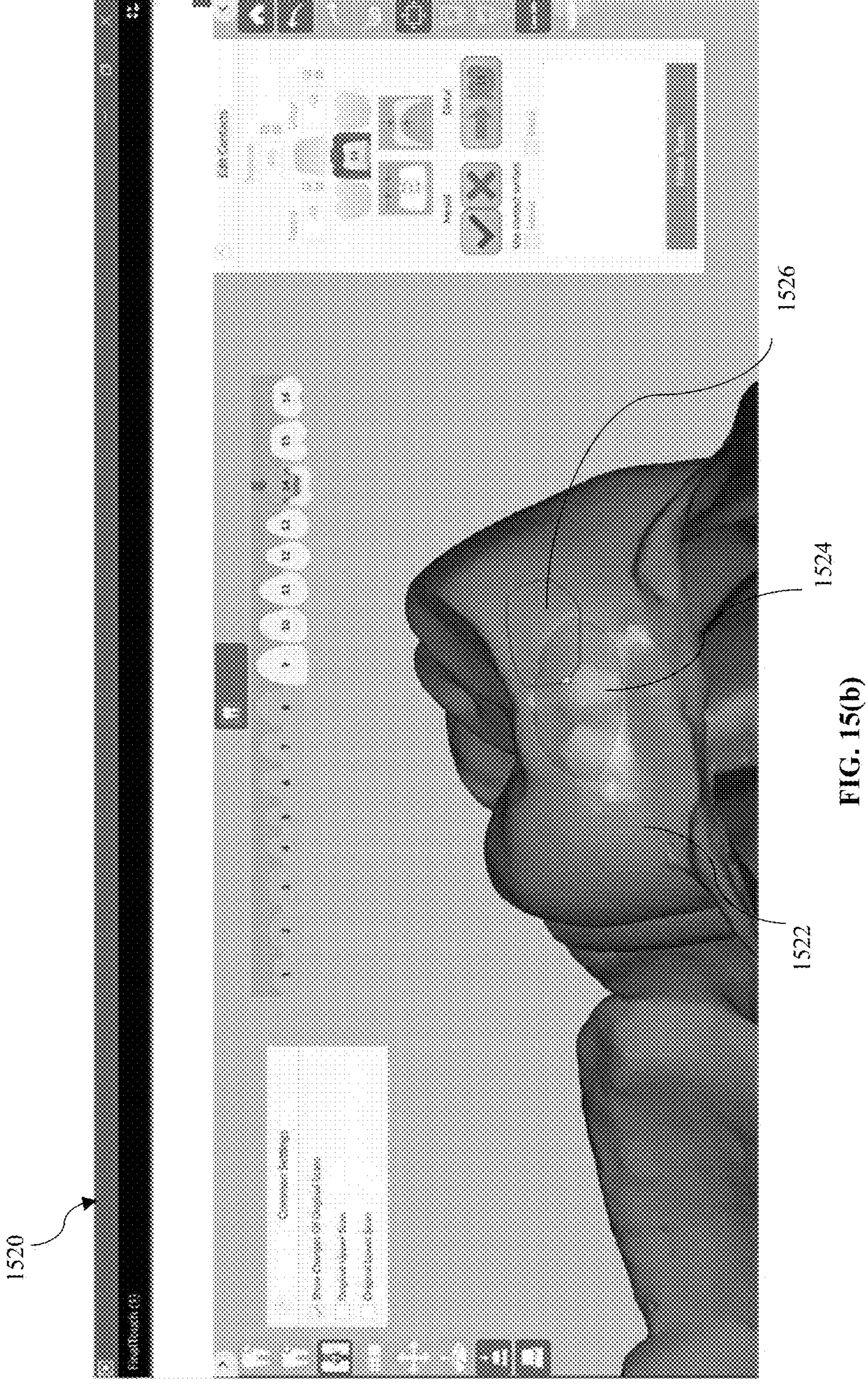
Figure 15C:
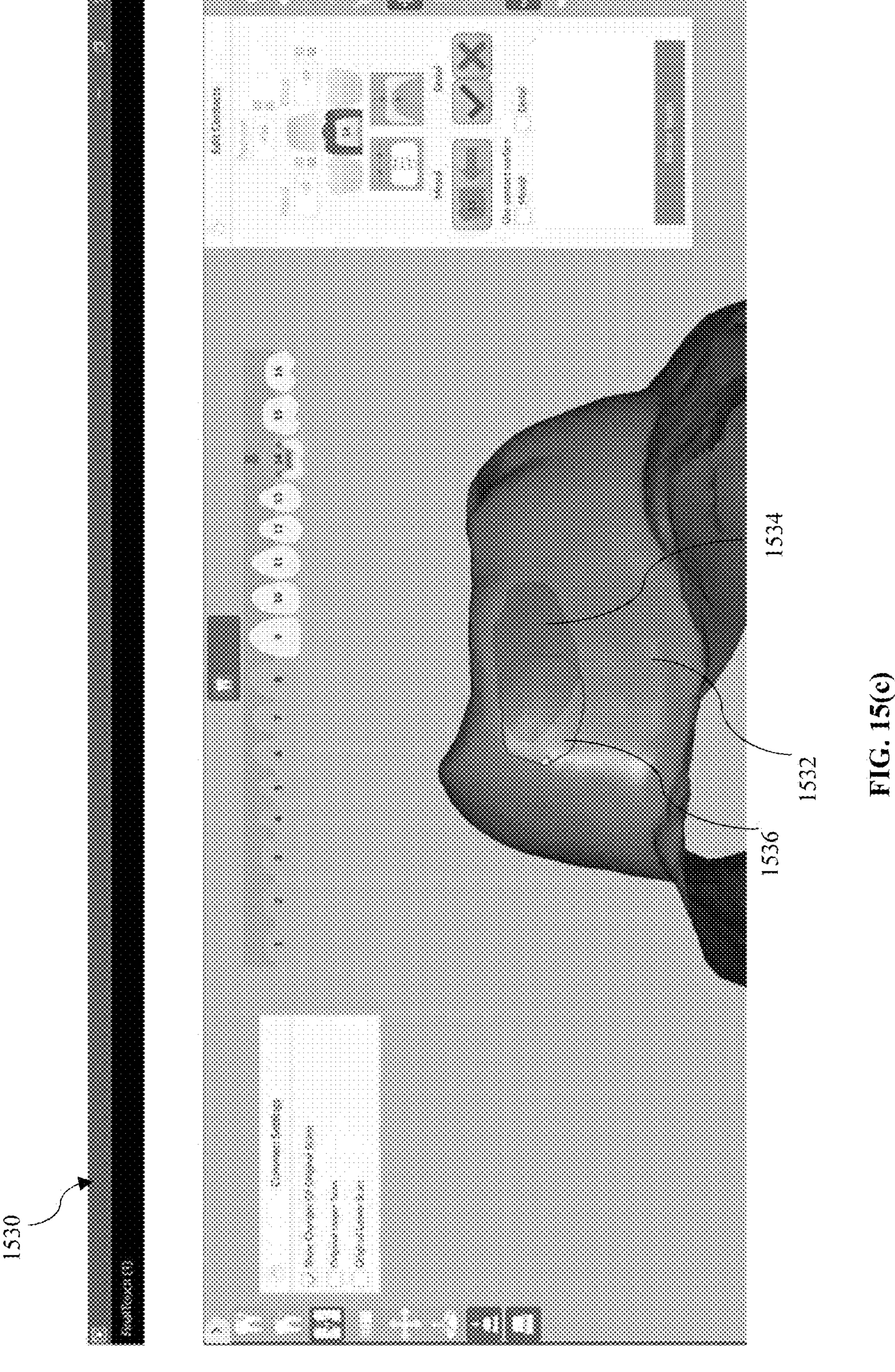
Figure 15D:
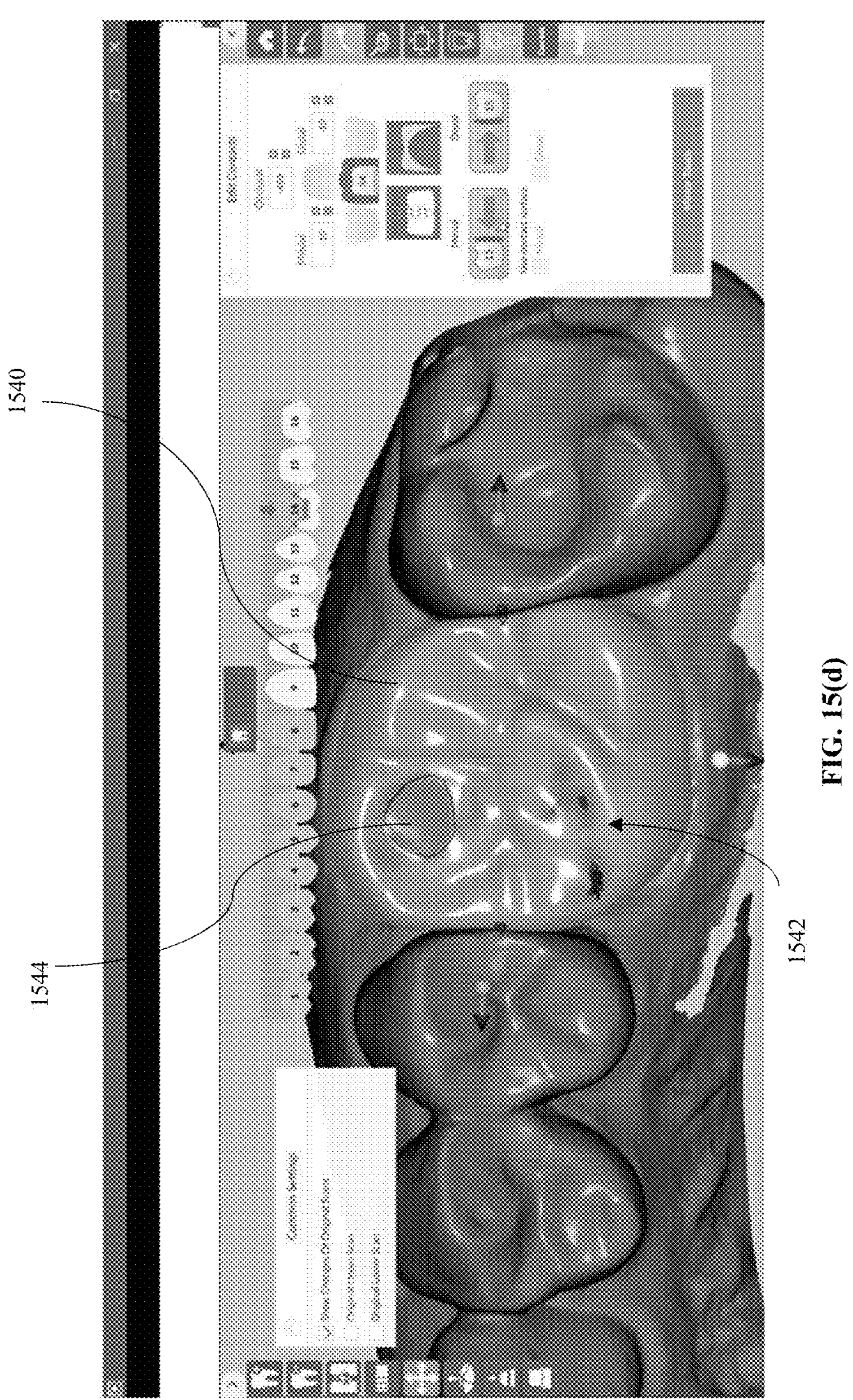
Figure 15E:
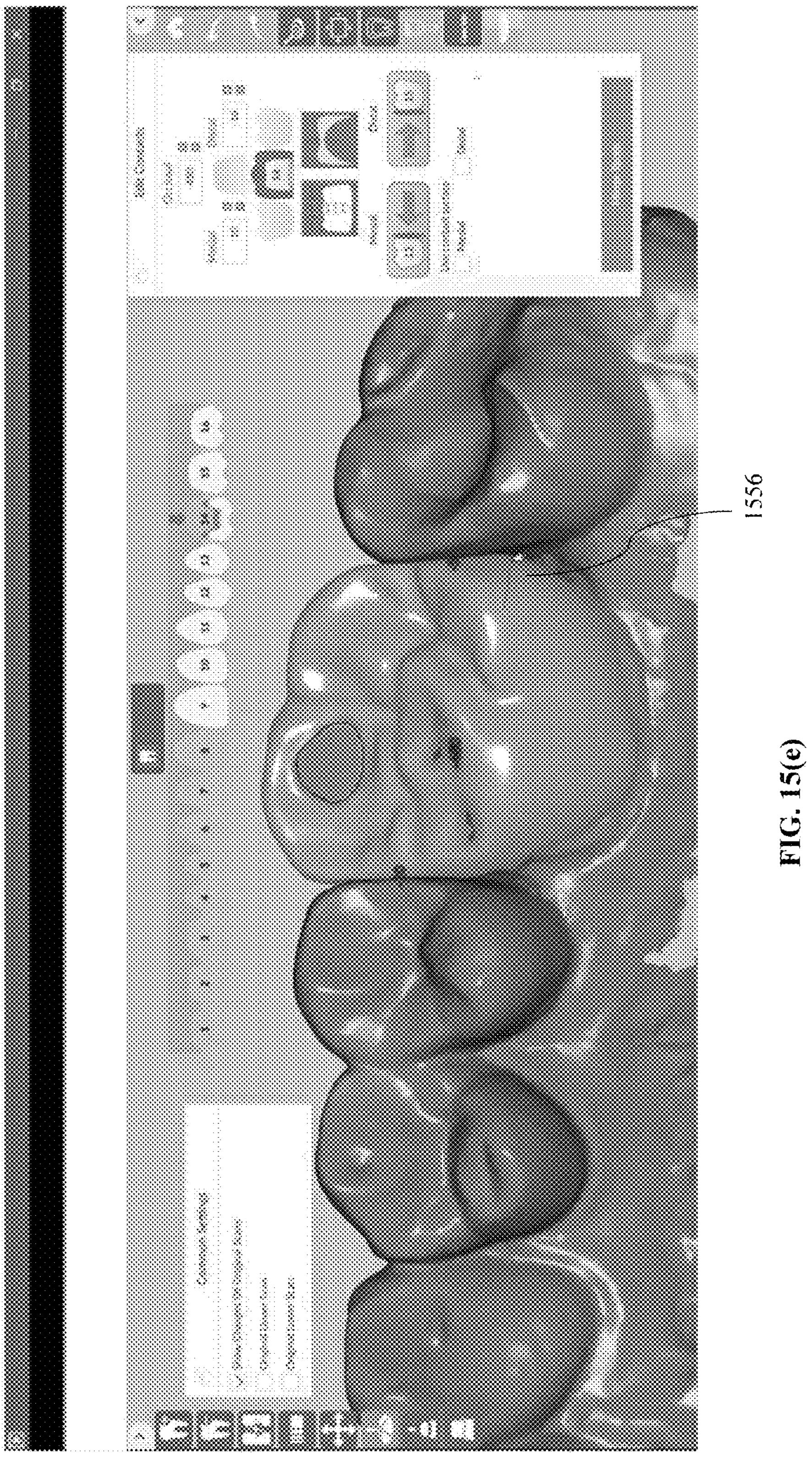
Figure 15F:
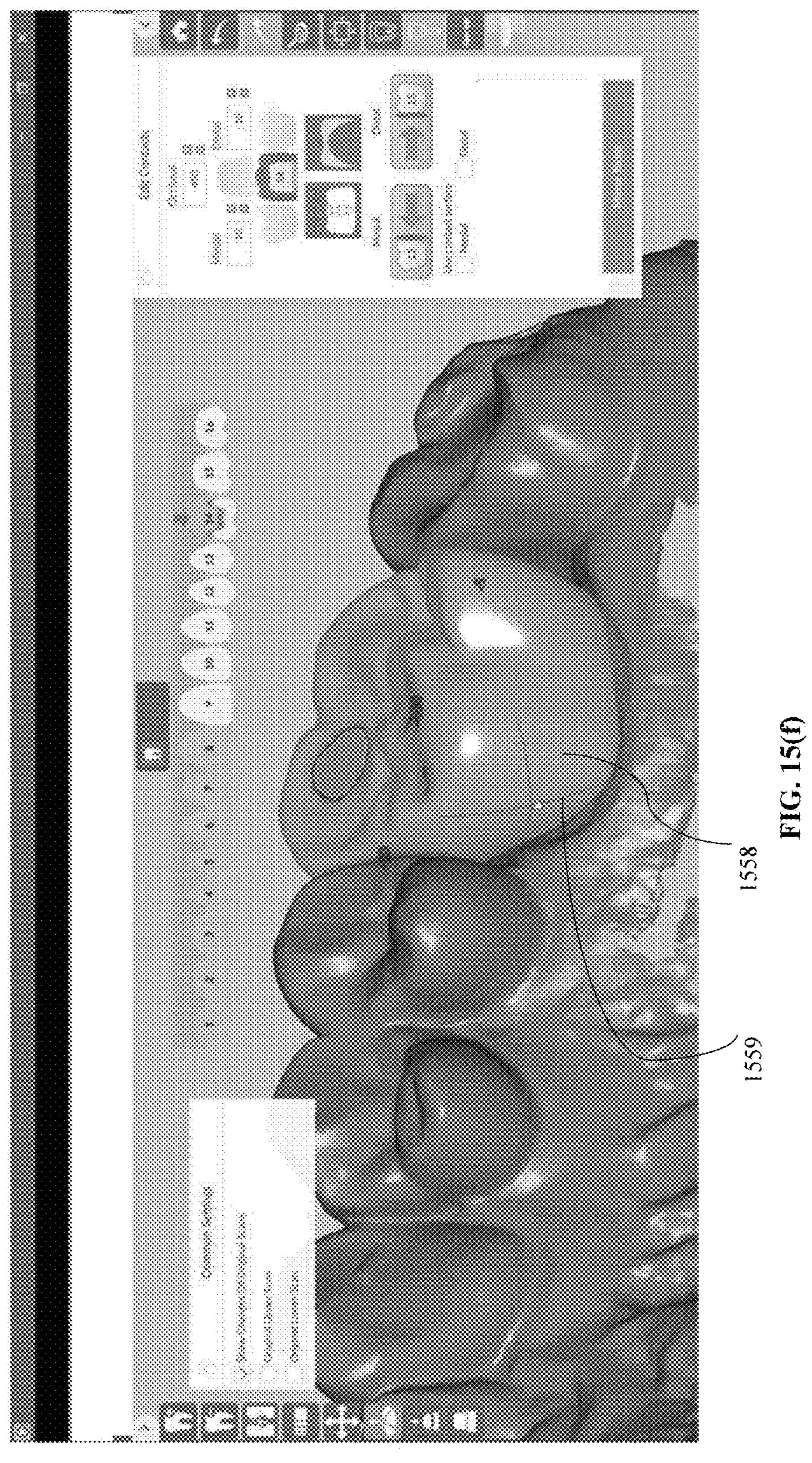
Figure 15G:
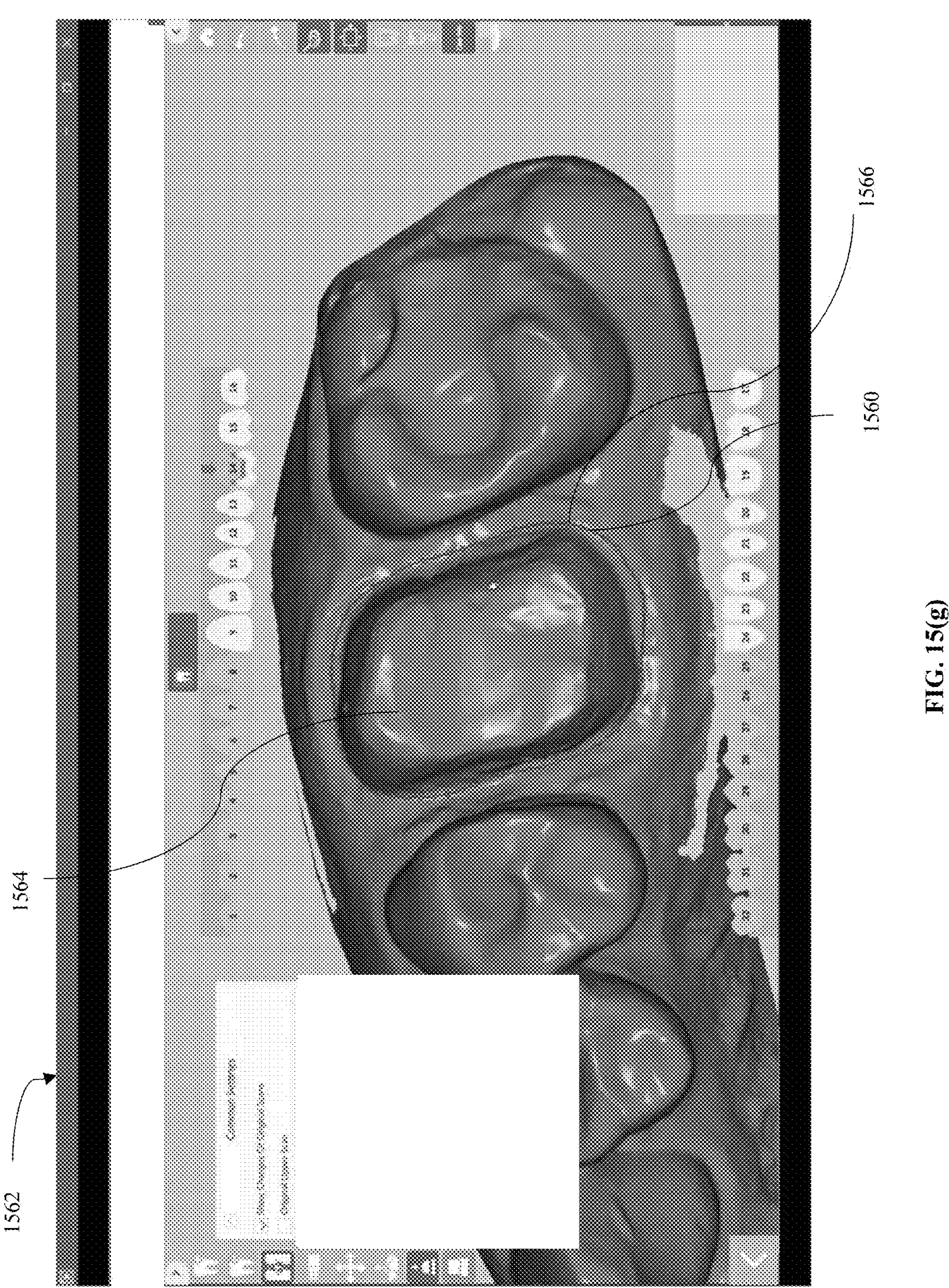

The computer-implemented method or another process can train a deep neural network such as the one discussed in FIG. 8, FIG. 13, FIGS. 14(*a*)-14(*b*), or other neural network to generate a 3D model of dental restoration using only the technician-designed dentition scan data set. In this way, the DNN generated 3D dental prosthesis will inherently include one or more features of dental prosthesis designed by a human technician using the library template. In some embodiments, the computer-implemented method or another process can train the deep neural network to output a probability vector that includes a probability of an occlusal surface of a technician-generated dental prosthesis representing the occlusal surface of a missing tooth at the preparation site or margin. Additionally, the computer-implemented method or another process can train a deep neural network to generate a complete 3D dental restoration model by mapping the occlusal surface having the highest probability and margin line data from the scanned dentition data to a preparation site. Additionally, the computer-implemented method or another process can train the deep neural network to generate the sidewall of the 3D dental restoration model by mapping sidewalls data of technician-generated dental prostheses to a probability vector that includes a probability of that one of the sidewalls matches with the occlusal surface and the margin line data from the preparation site.

Referring again to FIG. 12, to generate a new 3D model of a dental prosthesis for a new patient, the new patient's dentition scan data (e.g., scanned dental impression, physical model, or intraoral scan) received and ingested at 1215. In some embodiments, the new patient's dentition scan data can be preprocessed to transform 3D image data into 2D image data, which can make the dentition scan data easier to ingest by certain neural network algorithms. At 1220, using the previously trained deep neural network, one or more dental features in the new patient's dentition scan data are identified. The identified features can be a preparation site, the corresponding margin line, adjacent teeth and corresponding features, and surrounding gingiva for example.

At 1225, using the trained deep neural network, a full 3D dental restoration model can be generated based on the identified features at 1220. In some embodiments, the trained deep neural network can be tasked to generate the full 3D dental restoration model by: generating an occlusal portion of a dental prosthesis for the preparation site; obtaining the margin line data from the generated margin proposal as described previously or from patient's dentition scan data; optionally optimizing the margin line; and generating a sidewall between the generated occlusal portion and the margin line. Generating an occlusal portion can include generating an occlusal surface having one or more of a mesiobuccal cusp, buccal grove, distobuccal cusp, distal cusp, distobuccal groove, distal pit, lingual groove, mesiolingual cusp, etc.

In some embodiments, the trained deep neural network can obtain the margin line data from the generated margin proposal as described previously or from the patient's dentition scan data. In some embodiments, the trained deep neural network can optionally modify the contour of the obtained margin line by comparing and mapping it with thousands of other similar margin lines (e.g., margin lines of the same tooth preparation site) having similar adjacent teeth, surrounding gingiva, etc.

To generate the full 3D model, the trained deep neural network can generate a sidewall to fit between the generated occlusal surface and the margin line. This can be done by mapping thousands of sidewalls of technician-generated dental prostheses to the generated occlusal portion and the margin line. In some embodiments, a sidewall having the highest probability value (in the probability vector) can be selected as a base model in which the final sidewall between occlusal surface and the margin line will be generated.

FIG. 13 illustrates example input and output of the trained deep neural network 1300 (e.g., GAN) in accordance with some embodiments of the present disclosure. As shown, an input data set 1305 can the new patient's dentition scan having a preparation site 1310. Using the trained one or more deep neural network 1300, dental restoration server can generate a (DNN-generated) 3D model of a dental restoration 1315. DNN-generated dental prosthesis 1315 includes an occlusal portion 1320, a margin line portion 1325, and a sidewall portion 1330. In some embodiments, the deep neural network can generate the sidewall for prosthesis 1315 by analyzing thousands of technician-generated dental prostheses—which were generated based on one or more library templates—and mapping them to preparation site 1310. Finally, the sidewall having the highest probability value can be selected as a model to generate sidewall 1330.

FIG. 14(*a*) is a high-level block diagram illustrating a structure of a generative adversarial network (GAN network) that can be employed to identify and model dental anatomical features and restorations, in accordance with some embodiments of the present disclosure. On a high level, GAN network uses two independent neural networks against each other to generate an output model that is substantially indistinguishable when compared with a real model. In other words, GAN network employs a minimax optimization problem to obtain convergence between the two competing neural networks. GAN network includes a generator neural network 1410 and a discriminator neural network 1420. In some embodiments, both neural network 1410 and discriminator neural network 1420 are deep neural networks structured to perform unstructured and unsupervised learning. In the GAN network, both the generator network 1410 and the discriminator network (discriminating deep neural network) 1420 are trained simultaneously. Generator network 1410 is trained to generate a sample 1415 from the data input 1405. Discriminator network 1420 is trained to provide a probability that sample 1415 belongs to a training data sample 1430 (which comes from a real sample, real data 1425) rather than one of the data sample of input 1405. Generator network 1410 is recursively trained to maximize the probability that discriminator network 1420 fails to distinguish apart (at 1435) a training data set and an output sample generated by generator 1410.

At each iteration, discriminator network 1420 can output a loss function 1440, which is used to quantify whether the generated sample 1415 is a real natural image or one that is generated by generator 1410. Loss function 1440 can be used to provide the feedback required for generator 1410 to improve each succeeding sample produced in subsequent cycles. In some embodiments, in response to the loss function, generator 1410 can change one or more of the weights and/or bias variables and generate another output In some embodiments, the computer-implemented method or another process can simultaneously train two adversarial networks, generator 1410 and discriminator 1420. The computer-implemented method or another process can train generator 1410 using one or more of a patient's dentition scan data sets to generate a sample model of one or more dental features and/or restorations. For example, the patient's dentition scan data can be 3D scan data of a lower jaw including a prepared tooth/site and its neighboring teeth. Simultaneously, the computer-implemented method or another process can train discriminator 1420 to distinguish a generated a 3D model of a crown for the prepared tooth (generated by generator 1410) against a sample of a crown from a real data set (a collection of multiple scan data set having crown images). In some embodiments, GAN networks are designed for unsupervised learning, thus input 1405 and real data 1425 (e.g., the dentition training data sets) can be unlabeled.

FIG. 14(*b*) is a flow chart of a method 1450 for generating a 3D model of a dental restoration in accordance with some embodiments of the present disclosure. Method 1450 can be performed by the computer-implemented method or another process on the dental restoration server or one or more other computers in the cloud computing environment. The instructions, processes, and algorithms of method 1450 may be stored in memory of a computing device, and when executed by a processor, they enable computing device to perform the training of one or more deep neural networks for generating 3D dental prostheses. Some or all of the processes and procedures described in method 1450 may be performed by one or more other entities or processes within dental restoration server or within another remote computing device. In addition, one or more blocks (processes) of method 1450 may be performed in parallel, in a different order, or even omitted.

At 1455, the computer-implemented method or another process may train a generative deep neural network (e.g., GAN generator 1410) using unlabeled dentition data sets to generate a 3D model of a dental prosthesis such as a crown. In some embodiments, labeled and categorized dentition data sets may be used, but not necessary. The generative deep neural network may be implemented by the computer-implemented method or another process or in a separate and independent neural network, within or outside of the dental restoration server.

At 1460, and at substantially the same, the computer-implemented method or another process may also train a discriminating deep neural network (e.g., discriminator 1420) to recognize that the dental restoration generated by the generative deep neural network is a model versus a digital model of a real dental restoration. In the recognition process, the discriminating deep neural network can generate a loss function based on comparison of a real dental restoration and the generated model of the dental restoration. The loss function provides a feedback mechanism for the generative deep neural network. Using information from the outputted loss function, the generative deep neural network may generate a better model that can better trick the discriminating neural network to think the generated model is a real model.

The generative deep neural network and the discriminating neural network can be considered to be adverse to each other. In other words, the goal of the generative deep neural network is to generate a model that cannot be distinguished by the discriminating deep neural network to be a model belonging a real sample distribution or a fake sample distribution (a generated model). At 1465, if the generated model has a probability value indicating that it is most likely a fake, the training of both deep neural networks repeats and continues again at 1455 and 1460. This process continues and repeats until the discriminating deep neural network cannot distinguish between the generated model and a real model. In other words, the probability that the generated model is a fake is very low or that the probability that the generated model belong to a distribution of real samples is very high.

Once the deep neural networks are trained, method 1400 is ready to generate a model of a dental restoration based on the patient's dentition data set, which is received at 1470. At 1475, a model of the patient's dentition data set is generated using the received patient's dentition data set.

In some embodiments, the computer-implemented method can evaluate the generated 3D digital dental restoration model and determine whether to route the generated 3D digital dental restoration model to QC. In some embodiments, the computer-implemented method can use the same DNN (e.g. GAN) that was used for generation to determine whether the generated model of the dental restoration needs to be provided to quality control ("QC") based on a confidence score that can be output by same the DNN (e.g. GAN) used to generate the 3D digital dental restoration model. Alternatively, in some embodiments, a separate neural network such as a DNN (e.g. GAN) different from the one used to generate the 3D digital dental restoration model can be used to determine a confidence score. In some embodiments, the confidence score can be based on the probability that the 3D digital dental restoration model belongs to the distribution of real samples. In some embodiments, the confidence score can be based on the loss function. In some embodiments, the confidence score can be determined by the discriminator neural network that compares the generated dental restoration model to the distribution of real samples and outputs a confidence score indicating the degree to which they match. A higher confidence score can indicate a closer match between the generated dental restoration model and the distribution of real samples. A lower confidence score can indicate a lesser match between the generated dental restoration model and the distribution of real samples. In some embodiments, the computer-implemented method can determine whether the generated dental restoration model should be forwarded to QC based on the confidence score. For example, in some embodiments, if the confidence score output by the GAN equals or exceeds the confidence score threshold, then the computer-implemented method can provide the generated 3D digital dental restoration model directly to the end user and/or can route the generated 3D digital dental restoration model directly to a mill or 3D printing device or facility, for example, which can create a 3D physical dental restoration from the 3D digital dental restoration, for example. If, on the other hand, the confidence score output by the GAN is below the confidence score threshold, then the computer-implemented method can determine that QC needs to be performed on the generated 3D digital dental restoration model In some embodiments, the computer-implemented method can employ any other basis to determine whether QC is required for the 3D digital dental restoration model based on the confidence score of a deep neural network such as a GAN, for example. In some embodiments, upon determining the generated 3D digital dental restoration model requires QC, the computer-implemented method can route the generated 3D digital dental restoration model to QC. In some embodiments, routing can include providing the generated 3D digital dental restoration to a QC user. In some embodiments, routing can include placing the generated 3D digital dental restoration in a queue or other type of storage structure.

In some embodiments, the computer-implemented method can route the generated 3D digital dental prosthesis model to QC without evaluation. Accordingly, in some embodiments, the computer-implemented method can automatically route the 3D digital dental model comprising the virtual 3D dental prosthesis model to a quality control ("QC") user.

Some embodiments can include performing quality control ("QC") on the generated 3D digital dental prosthesis model. In some embodiments, the computer-implemented method can assign the 3D digital dental prosthesis model to a QC user/technician. In some embodiments, the computer-implemented method can assign the 3D digital dental prosthesis model to a user queue or other type of storage structure associated with the QC user. In some embodiments, the computer-implemented method can notify one or more QC users that one or more 3D digital prosthesis model(s) is/are ready for QC. In some embodiments, the QC user or the computer-implemented method can retrieve the next generated 3D digital dental restoration model on which to perform QC. In some embodiments, the computer-implemented method can display at least a portion of the 3D digital model of the patient's dentition that includes the generated 3D digital dental prosthesis model on a display such as a computer screen in a Graphical User Interface ("GUI") that can include interactive controls that can allow a dental technician, dentist, or other user to manipulate one or more features of the generated 3D digital dental prosthesis model.

FIG. 15(*a*) illustrates an example of a GUI 1500 that can be used as part of the QC process in some embodiments. In the example, a generated 3D digital restoration model is loaded for QC. The QC process can display at least a portion of the 3D digital dental model 1502 of a patient's dentition as well as a generated 3D digital dental prosthesis model 1504 in the GUI 1500 along with information regarding the 3D digital dental prosthesis model 1504 and its location and orientation with respect to surrounding dentition. For example, in some embodiments, the computer-implemented method can display and indicate a digital tooth number 1506 along with its neighboring digital teeth in a representation of the upper or lower jaw. In some embodiments, the QC process can display information regarding the digital tooth 1504 and its neighboring digital teeth in a panel such as panel 1508, or other suitable GUI display element known in the art. The panel 1508 can provide information regarding the occlusal, mesial, and distal relationships of the generated 3D digital dental prosthesis model with respect to surrounding dentition, for example. The GUI 1500 can provide one or control features to adjust the 3D digital dental prosthesis model 1504 in some embodiments. For example, in some embodiments, the QC process can provide controls to adjust contact points the automatically generated 3D digital dental prosthesis has with neighboring digital teeth in the 3D digital dental model.

In some embodiments, the QC process can provide GUI controls to adjust contact points such as mesial, distal, and/or occlusal contact points, for example. Mesial and distal contact points can be between the generated 3D digital dental prosthesis model and neighboring digital teeth in the 3D digital dental model. Occlusal contact points can between an occlusal surface of the generated 3D digital dental prosthesis model and an opposing digital tooth on an opposing digital jaw. FIG. 15(*b*) illustrates an example of adjusting mesial contact points in some embodiments. As illustrated in the figure, GUI 1520 can display at least a portion of the 3D digital dental model along with a mesial side of a generated 3D digital dental prosthesis model 1522. The GUI 1520 can display a mesial contact surface region 1524 between the 3D digital dental prosthesis model 1522 and its mesial neighboring tooth (not shown) in the 3D digital dental model. The GUI 1520 can provide an adjustment tool that can allow a user to select using an input device a mesial adjustment surface region 1526 that the computer-implemented method can reduce, for example. In some embodiments, the adjustment can decrease the size of the adjustment surface region such as adjustment surface region 1526. In some embodiments, the adjustment can increase the size of the adjustment surface region 1526. FIG. 15(*c*) illustrates an example of adjusting distal contact points in some embodiments. As illustrated in the figure, GUI 1530 can display at least a portion of the 3D digital dental model along with a distal side of a generated 3D digital dental prosthesis model 1532. The GUI 1530 can display a distal contact surface region 1534 between the 3D digital dental prosthesis model 1532 and its distal neighboring tooth (not shown) in the 3D digital dental model. The GUI 1530 can provide an adjustment tool that can allow a user to select using an input device a distal adjustment surface region 1536 that the computer-implemented method can adjust, for example. In some embodiments, the adjustment can decrease the size of the adjustment surface region such as adjustment surface region 1536. In some embodiments, the adjustment can increase the size of the adjustment surface region 1536.

In some embodiments, the QC process can provide GUI controls allowing a user to adjust the occlusal contact points. For example, FIG. 15(*d*) illustrates a generated 3D digital dental prosthesis model 1540 as viewed from the occlusal direction, showing an occlusal surface such as occlusal surface 1542. In some embodiments, the computer-implemented method can provide one or more digital tools to adjust an occlusion contact region, such as occlusal contact region 1544. In some embodiments, the adjustment can decrease the size of the adjustment surface region such as occlusal contact region 1544. In some embodiments, the adjustment can increase the size of the adjustment surface region 1544.

In some embodiments, the QC process can provide GUI controls allowing a user to adjust the shape or contour of the automatically generated 3D digital dental prosthesis as illustrated in FIG. 15(*e*) and FIG. 15(*f*), for example. In the example of FIG. 15(*e*), a user can select a contour region such as contour region 1556 to adjust. In the example of FIG. 15(*f*), a user can select a contour region such as contour region 1558. In some embodiments, the contour control can include a visual indicator that can define the contour region. One example of such a visual indicator can include an "X" or hash mark whose size can be adjusted by a user. One example of such a visual indicator is visual indicator 1559. Upon hovering a pointer over the generated 3D digital dental prosthesis, the visual indicator can appear on at least a portion of the generated 3D digital dental prosthesis model in some embodiments. The user can adjust the shape or contour of the contour region in some embodiments by pressing a button on an input device such as a mouse and dragging the contour region in a desired direction, as an example. Other GUI controls known in the art can be used to allow a user to adjust the shape or contour of the automatically generated 3D digital dental prosthesis in some embodiments.

In some embodiments, the QC process can display at least a portion of the 3D digital dental model 1564 of a patient's dentition and the automatically determined margin line proposal and allow a user to modify the determined margin line. FIG. 15(*g*) illustrates an example in which the QC process displays the determined margin line proposal 1560 in GUI 1562. In some embodiments, the 3D digital dental prosthesis is hidden or not displayed so that the determined margin line is visible. In some embodiments, GUI 1562 can provide virtual handles 1566 to allow a user to adjust the automatically determined margin line. This can advantageously allow, for example, correction of the automatically determined margin line as part of the QC process.

In some embodiments, once a QC user completes making any changes to the generated 3D digital dental prosthesis model as part of the QC process, the computer-implemented method can apply the changes to the 3D digital dental prosthesis model to provide a modified 3D digital dental prosthesis model. In some embodiments, where the changes to the model are major or fundamental, the computer-implemented method can re-generate the 3D digital dental prosthesis using the generating neural network. In some embodiments, major and/or fundamental changes can include, but are not limited to, for example, changes to the margin line proposal. In some embodiments, major and/or fundamental changes can be based on a user configurable value of change as measured geometrically in the model, for example. In some embodiments, where a modified margin line proposal triggers regeneration of the 3D digital dental prosthesis model, the computer-implemented method can provide the modified margin line as an input to the 3D digital dental prosthesis model generating neural network for the regeneration. In some embodiments, the computer-implemented method can, for the regenerated 3D digital dental prosthesis model, perform one or more features described herein, and provide the regenerated 3D digital dental prosthesis model for QC processing. In some embodiments, where the QC changes are not major or fundamental, the computer-implemented method can apply the changes to the generated 3D digital dental prosthesis model without regeneration.

In some embodiments, the computer-implemented method can evaluate whether QC modifications to the 3D digital dental prosthesis model made by the user during the QC process are significant enough to use as part of an improved training data set for the generating neural network. In some embodiments, for example, the computer-implemented method can geometrically evaluate the changes made, and if they exceed a user-configurable modification threshold, then the computer-implemented method can determine the changes made are significant and store the modified 3D digital dental prosthesis model (or the re-generated 3D digital dental prosthesis model) in the file system or in a database or other storage device locally or in a cloud computing environment. In some embodiments, the improved training data set can include one or more QC user modified or re-generated 3D digital dental prosthesis models (also known as improved 3D digital dental prosthesis models). The one or more improved 3D digital dental prosthesis models can represent the ground truth, for example. In some embodiments, the computer-implemented method can add one or more modified and/or regenerated 3D digital dental prosthesis models from the QC process to the improved training data set. In some embodiments, the computer-implemented method can optionally always add regenerated 3D digital dental prostheses models to the improved training data set.

In some embodiments, the computer-implemented method can, based on a user-configurable retraining threshold value, update the training data set of the 3D digital dental prosthesis model generating neural network based on the improved training data set and retrain the 3D digital dental prosthesis model generating neural network. In some embodiments, the training data set updated is the training data set used to train the discriminator neural network in a neural network such as a GAN, for example. In some embodiments, the retraining threshold value can be a user-configurable amount of time. For example, the computer-implemented method can periodically retrain the 3D digital dental prosthesis generating neural network in some embodiments. In some embodiments, the retraining threshold value can be a user-configurable number of improved 3D digital dental prosthesis models in the improved training data set. For example, the computer-implemented method can check and/or detect whether the number of improved 3D digital dental prosthesis models in the improved training data set meets and/or exceeds the retraining threshold value and if so, then the computer-implemented method can retrain the 3D digital dental prosthesis model generating neural network. In some embodiments, the computer-implemented method can, as part of a separate retraining process for generating the 3D digital dental prosthesis model, incorporate the improved training data set. In some embodiments, the computer-implemented method can perform retraining after being triggered manually by user initiation. In some embodiments, the computer-implemented method can retrain the 3D digital dental model generating neural network by adding the improved training data set to a current training data set of the 3D digital dental prosthesis model generating neural network and then performing training as described in the present disclosure.

Figure 16:
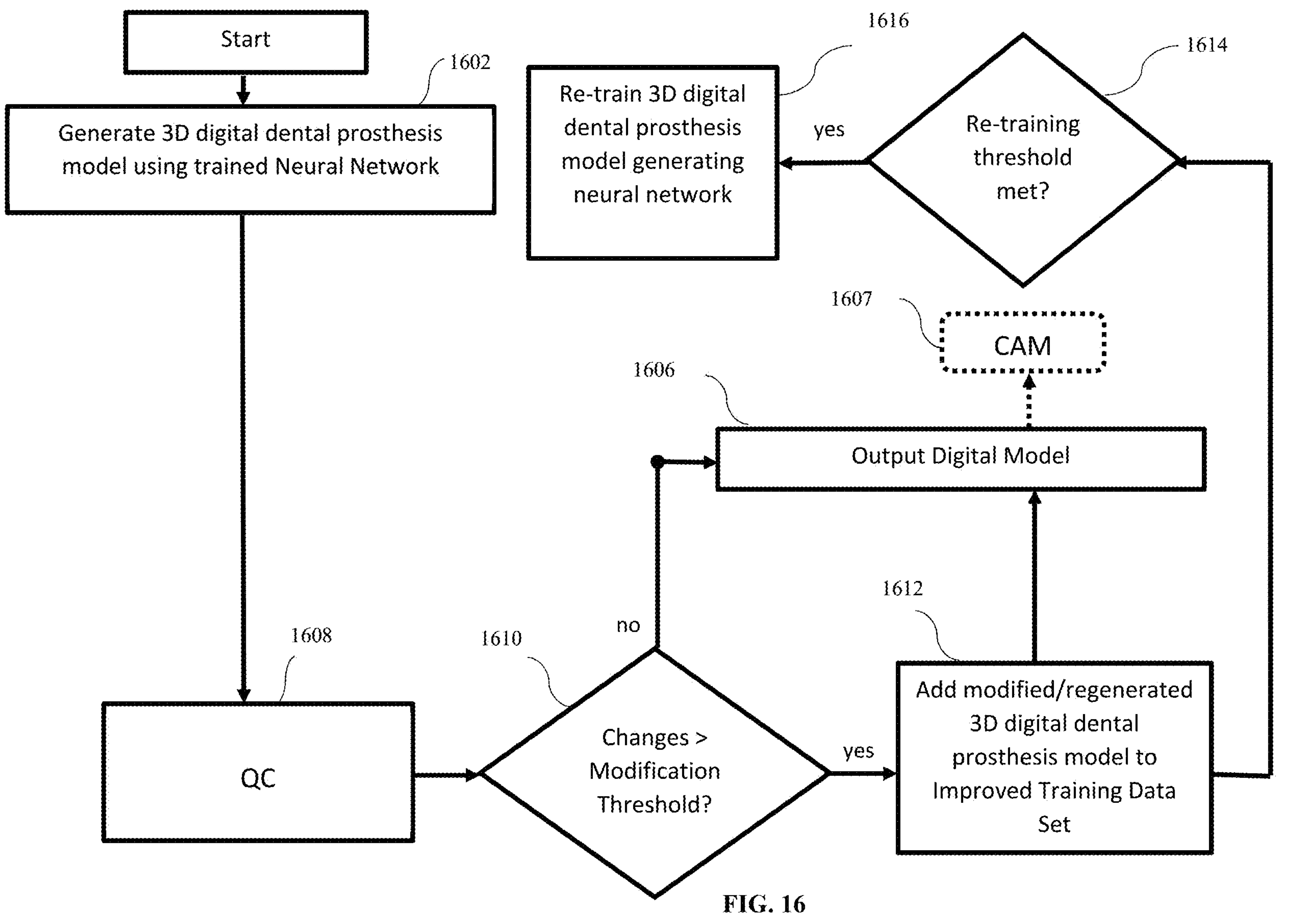
FIG. 16 illustrates an example of a flowchart in some embodiments.

FIG. 16 illustrates an example of a flowchart in some embodiments. The computer-implemented method can generate the 3D digital dental prosthesis model using a trained neural network as discussed previously at 1602. In some embodiments, the computer-implemented method can automatically provide the generated 3D digital dental prosthesis model and/or the 3D digital dental model to QC at 1608. After QC is performed as described previously in the present disclosure, the computer-implemented method can determine whether any changes/modifications made during QC exceed a user-configurable modification threshold at 1610. If the QC changes/modifications do not exceed the user-configurable modification threshold, then the 3D digital dental prosthesis model can be output at 1606 and can optionally be routed to a CAM at 1607. In some embodiments, the CAM 1607 is known in the art and can physically generate the 3D digital dental prosthesis model. In some embodiments, the computer-implemented method can output the 3D digital dental prosthesis model to a 3D printer, for example, or to a milling device and/or facility that are part of the cloud computing network or external to it, but in communication with the cloud computing network. If the QC changes/modifications exceed the user-configurable modification threshold, then the computer-implemented method can add the modified/regenerated 3D digital dental prosthesis model to an improved training data set at 1612. In some embodiments, the improved training data set can also include the previous training data set used to the train the 3D digital dental prosthesis generating neural network. In some embodiments, the computer-implemented method can determine whether a retraining threshold is met at 1614. If the retraining threshold is met at 1614, the computer-implemented method can re-train the 3D digital dental prosthesis model generating neural network at 1616. In some embodiments, re-training can be initiated manually.

Figure 17:
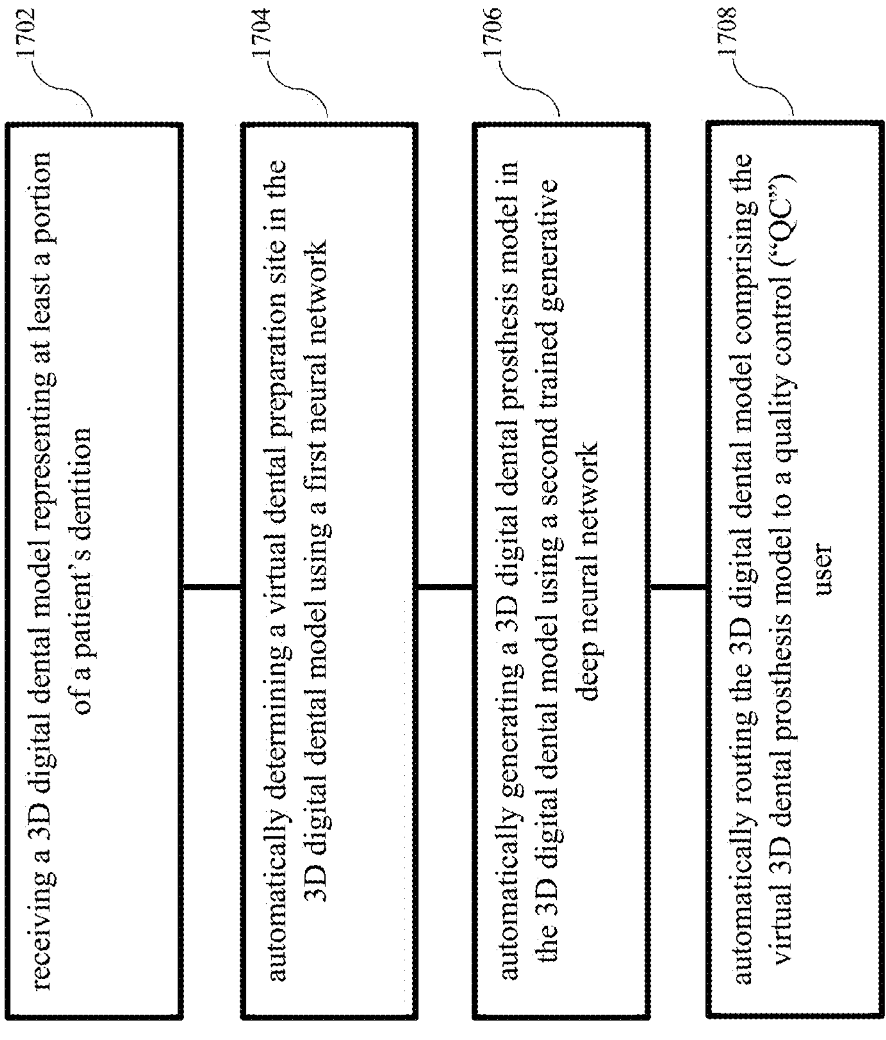
FIG. 17 illustrates an example of a computer-implemented method in some embodiments.

FIG. 17 illustrates an example of a computer-implemented method in some embodiments. The method can include receiving a 3D digital dental model representing at least a portion of a patient's dentition at 1702; automatically determining a virtual dental preparation site in the 3D digital dental model using a first neural network at 1704; automatically generating a 3D digital dental prosthesis model in the 3D digital dental model using a second trained generative deep neural network at 1706; and automatically routing the 3D digital dental model comprising the virtual 3D dental prosthesis model to a quality control ("QC") user at 1708.

In some embodiments, the method can include other features. In some embodiments, the 3D dental prosthesis generation trained neural network can include a generative adversarial network (GAN). In some embodiments, the first trained neural network can include a preparation site trained neural network. In some embodiments, the second trained neural network can include a 3D digital dental prosthesis generation neural network. Some embodiments can include automatically determining a margin line proposal using an inner representation trained neural network and a displacement value trained neural network. Some embodiments can include automatically determining a buccal direction using a buccal direction trained neural network. Some embodiments can include automatically determining an occlusal direction using an occlusal direction trained neural network. In some embodiments, responsive to the QC user making fundamental changes to the 3D digital dental prosthesis model, the computer-implemented method can automatically regenerate the 3D dental prosthesis model. In some embodiments, responsive to the QC user making significant changes to the 3D digital dental prosthesis model, the computer-implemented method can add the modified 3D digital dental prosthesis model to an improved training data set. Some embodiments can include retraining the 3D dental prosthesis generation trained neural network using a training data set including one or more 3D digital dental prosthesis models from the improved training data set. In some embodiments, the 3D dental prosthesis generation trained neural network can include a discriminator neural network in a GAN, and the retraining can include retraining the discriminator neural network.

In some embodiments, providing the 3D digital dental prosthesis model comprises generating the 3D digital dental prosthesis model rather than deforming a library tooth. In some embodiments, one or more features are performed after scanning is complete and the 3D digital dental model is generated.

In some embodiments, a system and/or non-transitory computer readable medium can implement/include one or more of the method features.

Some embodiments can additionally include generating a physical 3D dental prosthesis using computer aided manufacturing (CAM) known in the art. This can include additive manufacturing processes such as 3D printing, or milling processes known in the art in some embodiments.

One or more advantages of one or more features can include, for example, an integrated design work flow from automated design to generating a physical 3D dental prosthesis, and can include QC. For example, a 3D digital dental model with a preparation tooth can be uploaded and one or more features can automatically identify the preparation site, determine the occlusal direction, determine the buccal direction, detect the margin line, and generate a 3D digital dental prosthesis model design and automatically evaluate the quality of the design. This can, for example, advantageously speed up 3D digital dental prosthesis design. One or more features can also advantageously provide an empirically generated 3D digital dental prosthesis design, for example. One or more features can also advantageously provide a consistent methodology to generate a 3D digital dental prosthesis design, for example from a 3D digital dental model with a preparation site. One or more advantages can also include, providing a reproducible process to generate a 3D digital dental prosthesis model starting from a 3D digital dental model with a preparation site. One or more advantages can include, for example, uniformity in generating the 3D digital dental prosthesis model starting from a 3D digital dental model with a preparation site. One or more advantages of one or more features can provide, for example, improvements to all future automated generation of 3D digital dental prosthesis models based on QC of current designs in addition to improving the current design. One or more advantages can include, for example, scaling improvements of future 3D digital dental prosthesis models uniformly. One or more advantages can include allowing the one or more neural networks to learn and improve based on feedback from an expert, for example. One or more advantages can include, for example, empirically determining the confidence of a generated 3D digital dental prosthesis model and only routing defective ones to QC. This can advantageously improve the speed and efficiency of generating 3D digital dental prosthesis models while at the same time maintaining the consistency and quality of the design. One or more advantages can include, for example, control over the minimum confidence required to avoid QC, thereby establishing the minimum quality of the generated 3D digital dental prosthesis models. One or more advantages can include, for example, reducing the number of future defects in the generated 3D digital dental prosthesis model design by retraining the generating neural network to learn from mistakes and prevent or reduce the chances of them reoccurring. One or more advantages can include, for example, improved speed and efficiency in generating the 3D digital dental prosthesis model due to fewer defects. One or more advantages can include, for example, minimizing the amount of time and minimizing errors involved in CAD of dental restorations through integrating the features to generate the 3D digital dental prosthesis and providing an automatic and integrated solution capable of delivering quality designs consistently and allowing high level expertise to be integrated into the software through the QC feedback process, for example.

In some embodiments, one or more features can be performed by a user, for example. In some embodiments, some features such as interacting with a GUI be performed by a user using an input device while viewing the digital model on a display, for example. In some embodiments, the computer-implemented method can allow the input device to manipulate the digital model displayed on the display. For example, in some embodiments, the computer-implemented method can rotate, zoom, move, and/or otherwise manipulate the digital model in any way as is known in the art. In some embodiments, one or more features can be performed by a user using the input device. In some embodiments, one or more automated processes be initiated, for example, using techniques known in the art, such as a user selecting a button. Other techniques known in the art can be used to select a point or digital surface.

In some embodiments the computer-implemented method can display a digital model on a display and receive input from an input device such as a mouse or touch screen on the display for example. For example, the computer-implemented method can receive a 3D digital model of a patient's dentition. The computer-implemented method can, upon receiving an initiation command or receiving the 3D digital model, automatically generate a 3D digital dental prosthesis using one or more features described in the present disclosure. The computer-implemented method can, upon receiving manipulation commands, rotate, zoom, move, and/or otherwise manipulate the digital model in any way as is known in the art.

One or more of the features disclosed herein can be performed and/or attained automatically, without manual or user intervention. One or more of the features disclosed herein can be performed by a computer-implemented method. The features—including but not limited to any methods and systems—disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system comprising one or more computing devices. In some embodiments, the computing system may be a cloud-based computing system.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only examples and should not be taken as limiting the scope of the disclosure.

What is claimed is:

1. A computer-implemented method of providing a 3D digital dental restoration, the method comprising:

receiving a 3D digital dental model representing at least a portion of a patient's dentition;

automatically determining a virtual dental preparation site in the 3D digital dental model using a first neural network;

automatically generating a 3D digital dental prosthesis model in the 3D digital dental model using a second trained generative deep neural network; and automatically routing the 3D digital dental model comprising the 3D digital dental prosthesis model to a quality control ("QC") user, wherein the first neural network comprises a preparation site trained neural network and the second trained generative deep neural network comprises a 3D digital dental prosthesis generation neural network;

wherein responsive to the QC user making significant adjustments to the 3D digital dental prosthesis model, adding a modified 3D digital dental prosthesis model to an improved training data set for the second trained generative deep neural network.

2. The method of claim 1, further comprising displaying the generated 3D digital dental prosthesis model in a QC process to provide Graphical User Interface ("GUI") controls to adjust the 3D digital dental prostheses model as part of a QC process.

3. The method of claim 2, wherein the QC process allows the QC user to adjust one or more contact points.

4. The method of claim 2, wherein the QC process allows the QC user to adjust the shape or contour of the 3D digital dental prosthesis as part of the QC process.

5. The method of claim 2, wherein the QC process displays at least a portion of the 3D digital dental model and an automatically determined margin line proposal and the one or more control features allow the QC user to modify the determined margin line as part of the QC process.

6. The method of claim 1, wherein responsive to the QC user making fundamental adjustments to the 3D digital dental prosthesis model, automatically regenerating the 3D digital dental prosthesis model.

7. The method of claim 1, further comprising retraining the 3D digital dental prosthesis generation trained neural network using a training data set comprising one or more 3D digital dental prosthesis models from the improved training data set.

8. A non-transitory computer readable medium storing executable computer program instructions to provide a 3D digital dental restoration, the computer program instructions comprising instructions for:

receiving a 3D digital dental model representing at least a portion of a patient's dentition;

automatically determining a virtual dental preparation site in the 3D digital dental model using a first trained neural network;

automatically generating a 3D digital dental prosthesis model in the 3D digital dental model using a second trained generative deep neural network; and automatically routing the 3D digital dental model comprising the 3D digital dental prosthesis model to a quality control ("QC") user, wherein the first neural network comprises a preparation site trained neural network and the second trained generative deep neural network comprises a 3D digital dental prosthesis generation neural network;

where responsive to the QC user making significant adjustments to the 3D digital dental prosthesis model, adding a modified 3D digital dental prosthesis model to an improved training data set for the second trained generative deep neural network.

9. The medium of claim 8, further comprising displaying the generated 3D digital dental prosthesis model in a QC process to provide Graphical User Interface ("GUI") controls to adjust the 3D digital dental prostheses model as part of a QC process.

10. The medium of claim 9, wherein the QC process allows the QC user to adjust one or more contact points.

11. The medium of claim 9, wherein the QC process allows the QC user to adjust the shape or contour of the 3D digital dental prosthesis as part of the QC process.

12. The medium of claim 9, wherein the QC process displays at least a portion of the 3D digital dental model and an automatically determined margin line proposal and the one or more control features allow the QC user to modify the determined margin line as part of the QC process.

13. The medium of claim 8, wherein responsive to the QC user making fundamental adjustments to the 3D digital dental prosthesis model, automatically regenerating the 3D digital dental prosthesis model.

14. A system for providing a digital dental restoration, the system comprising:

a processor; and a non-transitory computer-readable storage medium comprising instructions executable by the processor to perform steps comprising:

receiving a 3D digital dental model representing at least a portion of a patient's dentition;

automatically determining a virtual dental preparation site in the 3D digital dental model using a first trained neural network;

automatically generating a 3D digital dental prosthesis model in the 3D digital dental model using a second trained generative deep neural network; and automatically routing the 3D digital dental model comprising the 3D digital dental prosthesis model to a quality control ("QC") user, wherein the first neural network comprises a preparation site trained neural network and the second trained generative deep neural network comprises a 3D digital dental prosthesis generation neural network;

wherein responsive to the QC user making significant adjustments to the 3D digital dental prosthesis model, adding a modified 3D digital dental prosthesis model to an improved training data set for the second trained generative deep neural network.

15. The system of claim 14, wherein responsive to the QC user making fundamental adjustments to the 3D digital dental prosthesis model, automatically regenerating the 3D digital dental prosthesis model.

* * * * *